(12) United States Patent
Murakami

(10) Patent No.: US 9,062,380 B2
(45) Date of Patent: Jun. 23, 2015

(54) PORE SEALING AGENT, MEMBER FOR COATING SPRAY DEPOSIT, AND BEARING

(75) Inventor: Kazutoyo Murakami, Mie (JP)

(73) Assignee: NTN CORPORATION, Osaka (JP)

( * ) Notice: Subject to any disclaimer, the term of this patent is extended or adjusted under 35 U.S.C. 154(b) by 697 days.

(21) Appl. No.: 12/225,936

(22) PCT Filed: Apr. 12, 2007

(86) PCT No.: PCT/JP2007/058030
§ 371 (c)(1),
(2), (4) Date: Oct. 1, 2008

(87) PCT Pub. No.: WO2007/119763
PCT Pub. Date: Oct. 25, 2007

(65) Prior Publication Data
US 2009/0245709 A1    Oct. 1, 2009

(30) Foreign Application Priority Data

Apr. 13, 2006  (JP) .................... 2006-111101
Jun. 29, 2006  (JP) .................... 2006-179417
Jun. 29, 2006  (JP) .................... 2006-179441
Jun. 29, 2006  (JP) .................... 2006-179462

(51) Int. Cl.
*C08L 63/00* (2006.01)
*C08G 59/16* (2006.01)
(Continued)

(52) U.S. Cl.
CPC ............ *C23C 26/00* (2013.01); *C08G 59/38* (2013.01); *C08G 59/42* (2013.01); *C23C 4/18* (2013.01); *F16C 33/201* (2013.01); *F16C 2240/40* (2013.01); *F16C 2206/40* (2013.01)

(58) Field of Classification Search
CPC .......... C08G 59/38; C08G 59/42; C23C 4/18; F16C 33/201; F16C 2240/40

USPC ........................................... 528/87
See application file for complete search history.

(56) References Cited

U.S. PATENT DOCUMENTS

| | | |
|---|---|---|
| 3,269,974 A | 8/1966 | Childs |
| 3,839,208 A | 10/1974 | Hermann |

(Continued)

FOREIGN PATENT DOCUMENTS

| | | |
|---|---|---|
| JP | 05-106014 A | 4/1993 |
| JP | 06-212391 A | 8/1994 |

(Continued)

OTHER PUBLICATIONS

English machine translation of JP 2004-131623 A, Murayama et al, Apr. 30, 2004.*

(Continued)

*Primary Examiner* — Peter F Godenschwager
*Assistant Examiner* — David Karst
(74) *Attorney, Agent, or Firm* — Hedman & Costigan, P.C.; James V. Costigan; Kathleen A. Costigan

(57) ABSTRACT

The present invention provides a pore-sealing agent and a member of coating a spray deposit. The pore-sealing agent is excellent in permeability into pores (gaps) of a spray deposit and can be favorably filled thereinto and is capable of sealing pores until gaps in a spray deposit material are substantially entirely filled. The pore-sealing agent contains an epoxy group-containing component and a hardener and does not contain a polymerizable vinyl group-containing solvent. The epoxy group-containing component is a mixture containing a polyglycidyl ether compound in which the number of epoxy groups contained in one molecule is not less than three as and, an alkylenediglycidyl ether compound or a cyclic aliphatic diepoxy compound, both of which contain two epoxy groups in one molecule thereof. Excluding the hardener, the mixing ratio of the polyglycidyl ether compound to the epoxy group-containing component of the mixture is 10 to 95 wt %.

12 Claims, 5 Drawing Sheets

(51) Int. Cl.
*F16C 33/00* (2006.01)
*C23C 26/00* (2006.01)
*C08G 59/38* (2006.01)
*C08G 59/42* (2006.01)
*C23C 4/18* (2006.01)
*F16C 33/20* (2006.01)

(56) References Cited

U.S. PATENT DOCUMENTS

| | | | | |
|---|---|---|---|---|
| 4,412,047 | A | * | 10/1983 | Monnier et al. ............. 525/507 |
| 4,954,602 | A | * | 9/1990 | Akutagawa et al. ........... 528/93 |
| 5,650,477 | A | * | 7/1997 | Parodi et al. .................... 528/93 |
| 5,872,163 | A | * | 2/1999 | Hollstein et al. .............. 523/216 |
| 6,040,397 | A | * | 3/2000 | Hooper et al. ................ 525/526 |
| 2001/0034382 | A1 | | 10/2001 | Sumita |
| 2003/0073770 | A1 | * | 4/2003 | Klemarczyk et al. ......... 524/404 |
| 2005/0288458 | A1 | * | 12/2005 | Klemarczyk et al. ......... 525/533 |

FOREIGN PATENT DOCUMENTS

| | | | | | |
|---|---|---|---|---|---|
| JP | 10-259469 | A | | 9/1998 | |
| JP | 2003-183806 | A | | 7/2003 | |
| JP | 2004131623 | A | * | 4/2004 | ............. C08G 59/42 |
| JP | 2004-225116 | A | | 8/2004 | |
| JP | 2004-300509 | A | | 10/2004 | |
| JP | 2006-028498 | A | | 2/2006 | |

OTHER PUBLICATIONS

PCT Search Report dated Jul. 3, 2007.
EPO Search Report dated Oct. 6, 2010.

* cited by examiner

PORE SEALING AGENT, MEMBER FOR COATING SPRAY DEPOSIT, AND BEARING

TECHNICAL FIELD

The present invention relates to a pore-sealing agent; a member for coating a spray deposit; and a bearing and more particularly to a pore-sealing agent containing epoxy resin, a member, for coating a spray deposit, which is obtained by treating the spray deposit with the pore-sealing agent; and the bearing.

BACKGROUND ART

A technique of thermally spraying hard particles and powder of such as metal or ceramics to the surface of a base material of a mechanical component part composed of steel or the like to enhance the heat resistance, wear resistance, and corrosion resistance of the mechanical component part is conventionally carried out. Normally the spray deposit has pores such as voids and gaps generated in the process of forming the spray deposit. The pore imparts various properties to the spray deposit. Some pores show the form of interconnected pores interconnecting the surface of the base material and the ground thereof with each other to allow communication between environment which contacts the surface of the spray deposit and the base material covered with the spray deposit. There is a phenomenon that a gas or a liquid that has contacted the exterior surface of the spray deposit permeates and diffuses to the ground of the base material through the interconnected pores. Consequently there occurs a case in which the thermally sprayed material corrodes and deteriorates or a case in which when the base material is carbon steel, the base material selectively corrodes and deteriorates at a contact interface between the spray deposit and the base material, with the result that the adhesion of the spray deposit to the base material is damaged and the spray deposit separates from the base material. Ceramics are also thermally sprayed to the main body of a mechanical component part to secure insulation between the main body of the mechanical component part and a member where the mechanical component part is mounted. But the thermally sprayed ceramic may be subjected to insulation failure owing to the above-described permeation and diffusion phenomena of a gas or a liquid. Consequently there is a fear that a desired insulation resistance is not displayed.

To overcome the above-described problem, pore-sealing is performed to allow the spray deposit to have a high environment-intercepting performance after the spray deposit is formed. As a widely known pore-sealing method, a method of applying a pore-sealing agent containing synthetic resin such as epoxy resin, acrylic resin, urethane resin, phenol resin, or fluoro resin dissolved in an organic solvent to the surface of the spray deposit is known. But in this method, the pore-sealing agent is merely applied to the surface of the spray deposit and does not permeate to the bottom of pores. Therefore the surface of the spray deposit is removed by grinding or abrasion after the pores are sealed to maintain the configuration (dimension) accuracy, there is a case in which the effect of the pore-sealing for the spray deposit can be hardly expected. Further the coating made of the synthetic resin wears owing to abrasion during use and the effect of the pore-sealing does not continue for a long time.

Efforts for improving the adhesion of the thermally spray deposit material to the metal base material by sealing pores have been frequently made.

Ordinary spray deposit does not form a chemical bond to a surface on which the spray deposit is to be formed, but constitutes an adhesion to the base material owing to a mechanical tightening force (anchoring effect). In the case where a material is thermally sprayed to mechanical component parts such as a gear, a bearing, a spindle, and the like made of a metal which demand strict dimensional accuracy, the finish of surfaces of the mechanical component parts are frequently made by grinding. Thus the surface roughness Ra is frequently less than 1 μm. Therefore in thermally spraying the material to the surfaces of the metal component parts, treatment of increasing the surface roughness Ra up to not less than 1 μm is frequently made by a known surface modifying method such as shot blast or tumbler treatment. These methods are capable of improving the adhesion of the spray deposit to the base material to some extent. But in dependence on the extent of the surface modification, the dimensional accuracy of the base material deteriorates and insufficient firing of the surface occurs. Thereby a disadvantage that the property of the base material may deteriorate and the like. Thus there is a limitation in the improvement of the adhesive strength.

Efforts of using a chemical adhesive strength in combination with the physical adhesive strength have been made to assist the physical adhesive strength. But in the above-described ordinary pore-sealing methods, the pore-sealing agent is merely applied to the surface of the spray deposit and does not reach the interface at bottoms of pores. The above-described ordinary pore-sealing methods merely enhances the adhesive strength between ceramic particles disposed in the vicinity of the outermost surface of the spray deposit and does not allow a chemical adhesive strength to be displayed between the metal base material and the thermally spray deposit material.

As methods for improving the above-described methods, the method of utilizing photo-setting resin which is hardened by visible light rays for the pore-sealing agent (see patent document 1); the method of depositing and filling paint particles in pores of the spray deposit in an electrophoresis phenomenon by using an electrolytic deposition paint (see patent document 2); the method of thermally spraying a material to which $B_2O_3$ forming a vitreous substance has added to the surface of the matrix, heating the spray deposit to fuse $B_2O_3$, and filling the $B_2O_3$ into gaps generated in the spray deposit (see patent document 3); and the method of adding $B_2O_3$ forming a vitreous substance to the thermally sprayed material to form a spray deposit and by the subsequent heating treatment, the fused $B_2O_3$ performing the pore-filling operation (see patent document 3) are known. But these methods have problems that in addition to the use of a pressurizing step or a depressurizing step, special apparatuses or complicated steps are required and thus these methods are unsuitable for an industrial producing method.

Therefore, the method of using at least one kind selected from among (i) synthetic resin, (ii) polymerizable organic solvent, and (iii) fluorine-based surface active agent and perfluoro group-containing silicon compound as essential compositions of the pore-sealing agent is known (see patent document 4). This method is intended to form a hardened substance of only "(ii) polymerizable organic solvent" or form a hardened substance of (ii) polymerizable organic solvent compositely with (i) synthetic resin in hardening (i) the synthetic resin. But actually it is difficult to harden the solvent portion by heating only (ii) polymerizable organic solvent because oxygen dissolved in the solution inhibits polymerization. When "styrene monomer" which is a representative vinyl group-containing organic compound as shown in the "example" of the patent document 4 is used as the polymerizable solvent, a polymerization reaction is not sufficiently made at the temperature when epoxy resin hardens, and an unreacted polymerizable solvent remains in the epoxy resin. Thus there is a fear in a long-term stability of the pore-sealing resin after it hardens. As described in the specification of the patent document 4, to accelerate the polymerization reaction of the polymerizable solvent, it is necessary to add a radical polymerization starter or the like thereto and eliminate oxygen dissolved in the system of the pore-sealing agent to a high extent. But the high-temperature type radical polymerization starter is normally composed of an organic peroxide which is very reactive and has a danger of explosion. Thus it is necessary to take care in handling it. The above-described concern is softened by selecting a low-temperature type radical polymerization starter. But even at a low temperature, a decomposition reaction of the polymerization starter progresses. Thus it is necessary to take care for the pot life of an unhardened pore-sealing agent. In addition, from the standpoint of the amount of the oxygen dissolving in the pore-sealing agent, to enhance the preservation stability, there is a problem that greatest possible care should be taken.

A polymer obtained by the polymerization of the polymerizable organic solvent such as "styrene monomer" has a problem that gaps are generated in the hardened substance and is inferior in the adhesion to the base material.

As described above, in the conventional art, to stably maintain the environment-intercepting performance of the spray deposit, it is necessary to provide very complicated steps in the operation of permeating the pore-sealing agent to the surface of the base material. Even though the pore-sealing agent can be permeated into the surface of the base material, there is a concern resulting from the addition of the polymerizable solvent to the epoxy resin. In addition, because fine gaps are generated owing to the progress of the hardening and contraction of the pore-sealing agent with the passage of time, there is a fear in maintaining the environment-intercepting performance of the pore-sealed mechanical member for a long time.

Patent document 1: Japanese Patent Application Laid-Open No. 5-106014

Patent document 2: Japanese Patent Application Laid-Open No. 6-212391

Patent document 3: Japanese Patent Application Laid-Open No. 10-259469

Patent document 4: Japanese Patent Application Laid-Open No. 2003-183806

DISCLOSURE OF THE INVENTION

Problems to be Solved by the Invention

The present invention has been made to cope with the above-described problem. It is an object of the present invention to provide a pore-sealing agent which is excellent in permeability into pores (gaps) of a spray deposit and can be favorably filled thereinto, capable of sealing pores until a state in which gaps in a spray deposit material are substantially entirely filled is obtained, capable of avoiding a pore-sealing property from deteriorating with age, capable of dramatically improving the adhesion of a thermally sprayed ceramic deposit to a base material, and avoiding the adhesive strength from deteriorating with age after the pore-sealing agent is left at a high temperature and subjected to a heat cycle treatment; a pore-sealing method; a member, for coating a spray deposit, which has a sufficient amount of a pore-sealing agent-permeated and pore-sealing agent-filled layer even though the surface of the spray deposit is ground or abraded and which is capable of improving properties such as a mechanical property and an electrical property; and a bearing using the member for coating the spray deposit.

Means for Solving the Problems

A pore-sealing agent of the present invention, for a spray deposit, contains an epoxy group-containing component and a hardener and does not contain a polymerizable vinyl group-containing solvent. The epoxy group-containing component is a mixture containing a polyglycidyl ether compound in which the number of epoxy groups contained in one molecule is not less than three as an essential component thereof and at least one compound selected from among an alkylenediglycidyl ether compound and a cyclic aliphatic diepoxy compound, both of which contain two epoxy groups in one molecule thereof; and excluding the hardener, 10 to 95 wt % and preferably 10 to 80 wt % of the polyglycidyl ether compound is mixed with an entirety of the epoxy group-containing component.

The epoxy group-containing component further contains a monoglycidyl ether compound in which the number of the epoxy groups contained in one molecule is one.

An amount of an epoxy group contained in 1 g of the pore-sealing agent is set to a range from 3.0 mmol to 4.0 mmol.

The hardener contains an acid anhydride.

A density of the pore-sealing agent after the pore-sealing agent hardens is smaller than a density of the pore-sealing agent before the pore-sealing agent hardens.

The other pore-sealing agent of the present invention contains the epoxy group-containing component and the hardener. The hardener is diethylglutaric anhydride. The epoxy group-containing component contains the polyglycidyl ether compound in which the number of the epoxy groups contained in one molecule is not less than three.

A member for coating a spray deposit, of the present invention, includes a spray deposit, disposed on a metal base material, which is pore-sealed with the pore-sealing agent.

A bearing of the present invention includes the member for coating the spray deposit formed on a surface of a bearing-constructing member.

Effect of the Invention

The pore-sealing agent of the present invention for the spray deposit contains the epoxy group-containing component and the hardener and does not contain the polymerizable vinyl group-containing solvent. The epoxy group-containing component is a mixture containing the predetermined polyglycidyl ether compound as its main component. Therefore it is possible to effectively restrain the generation of voids owing to the volatilization of the solvent of the pore-sealing agent and perform a pore-sealing operation until the state in which the gaps of the thermally spray deposit material are substantially entirely filled with the pore-sealing agent is obtained.

Because a plurality of the polyglycidyl ether compounds of the mixture are similar in the molecular structures thereof, they are compatible with each other and thus there is no fear that a phase separation occurs. Thus the pore-sealing agent easily permeates into the pores. Thereby it is possible to avoid the pore-sealing state of the thermally spray deposit material and the pore-sealing characteristic from deteriorating with age. Therefore it is possible to prevent damage of the spray deposit such as the separation during the use of a bearing or the like and prolong the life of mechanical component parts.

Because the pore-sealing agent of the present invention contains 3.0 mmol to 4.0 mmol of the epoxy group per gram, it is possible to optimize the amount of the ether linkage formed by the ring opening polymerization of the epoxy group contained in the pore-sealing agent and that of hydroxyl group. Therefore by permeating the pore-sealing agent having a high adhesiveness into the spray deposit, it is possible to improve the adhesion of the spray deposit to the base material and in addition the adhesive strength between the spray deposits. Thereby it is possible to prevent the adhesive strength from deteriorating when the pore-sealing agent is left at a high temperature for a long time and placed in a heat cycle environment.

The density of the pore-sealing agent after the pore-sealing agent hardens is smaller than the density of the pore-sealing agent before the pore-sealing agent hardens. Therefore the volume of the pore-sealing agent expands when it hardens. Therefore when a hardening and contracting reaction progresses in a long-time heat cycle treatment and leaving at high temperature, fine voids are not generated in the spray deposit. Consequently it is possible to restrain the deterioration of the insulation resistance characteristic and the withstand voltage property in a humid atmosphere even when a long time elapses at a high temperature after the pores are sealed.

The other pore-sealing agent of the present invention for the spray deposit contains the epoxy group-containing component and the hardener. The hardener comprises diethylglutaric anhydride. Thereby it is possible to decrease the viscosity of the pore-sealing agent consisting of the mixture, and further the pore-sealing agent of the present invention is superior in the permeability to a pore-sealing agent containing an acid anhydride other than the diethylglutaric anhydride as the hardener thereof. Further by using the compounds of the present invention, the spray deposit has an excellent toughness after the pore sealing operation is performed. Thus when a member to be treated is subjected to a high temperature for a long time and a heat cycle treatment is performed, it is possible to restrain the deterioration of the pore-sealing performance and the insulation property of the spray deposit. Furthermore in a use where the member to be treated may be strained when an outer ring of a thin bearing or the like is manufactured or mounted on a machine, it is possible to restrain a decrease of the insulation property by applying the pore-sealing agent which has a high permeability and is capable of imparting toughness to the outer ring or the like.

The pore-sealing agent forming the member for coating a spray deposit of the present invention is excellent in its permeability into pores (gaps) and pore-filling performance. Further pore-sealing agent-permeated and pore-sealing agent-filled layer is present to a sufficient extent, when the surface of the spray deposit is ground or abraded after the pores are sealed. Consequently the spray deposit greatly improves the performance of protecting the base material and is capable of improving the properties of the base material such as the mechanical and electrical properties thereof. Furthermore it is possible to improve the adhesive strength between the spray deposit and the base material and in addition between the spray deposits. Therefore the member for coating the spray deposit formed by using the pore-sealing agent of the present invention can be preferably used as a bearing.

BEST MODE FOR CARRYING OUT THE INVENTION

As a result of the present inventors' energetic investigation of a pore-sealing agent capable of preventing the pore-sealing characteristic of a spray deposit material from deteriorating and preventing a spray deposit from being damaged during the use of a bearing or the like, they have found that the spray deposit pore-sealed by using the pore-sealing agent which contains a mixture of predetermined polyglycidyl ether compounds having different number of epoxy groups in one molecule is excellent in its permeability and pore-filling performance for pores (gap); that when a surface of the spray deposit is ground or abraded after the pores are sealed, a layer in which the pore-sealing agent has permeated and filled is present to a sufficient extent; and that the spray deposit greatly improves its performance of protecting the base material and is capable of improving the properties of the base material such as the mechanical and electrical properties thereof.

This is considered as follows: The pore-sealing agent which has penetrated into particle-particle boundaries owing to its excellent permeability and pore-filling performance appropriately fills the particle-particle boundaries, firmly adheres to the particle-particle boundaries owing to its excellent adhesive strength, and effectively restrains the generation of voids which is caused by the volatilization of a solvent because the pore-sealing agent does not contain the polymerizable vinyl group-containing solvent. Thereby it is possible to perform a pore-sealing operation until the state in which the gaps of the thermally spray deposit material are substantially entirely filled with the pore-sealing agent is obtained.

It has been also found that the spray deposit pore-sealed by using the pore-sealing agent of the present invention is capable of improving not only the adhesive strength between the spray deposit and the base material, but also the adhesive strength between the spray deposits.

Pores are sealed by applying or spraying an unhardened resin to a porous material after thermal spraying finishes. By performing calcining treatment thereafter, the unhardened resin hardens.

At this time, after the applied pore-sealing agent permeates into fine voids inside the porous material, the pore-sealing agent is hardened by being heated to form a three-dimensional reticulate structure. At this time, in the epoxy resin which has permeated into the voids, a cleavage reaction of an oxirane ring occurs in the co-existence of a hardener and a curing catalyst to form an ester linkage or an ether linkage in dependence on the kind of the hardener, and the epoxy resin hardens.

When an acid anhydride-based hardener is selected as the hardener, the ester linkage is formed. This linkage having a high-polarity portion in its structure allows a strong adhesive action to be displayed between the pore-sealing agent and a member, treated with the pore-sealing agent, which is composed of ceramic or cermet and between the pore-sealing agent and bearing steel or cast iron treated therewith.

When a pore-sealing agent which contracts greatly in its volume after it hardens is used, the pore-sealing agent causes the porous material to generate pores therein after the pore-sealing agent is hardened by being heated. The generated fine voids become a clue to the penetration of atmospheric water during the use of a pore-sealed bearing, thus causing the base material thereof to be corroded and the electric insulation property thereof to deteriorate. The pore-sealing agent of the present invention has a property that its specific gravity after it hardens is smaller than its specific gravity before it hardens. That is, the pore-sealing agent of the present invention has the property that its volume increases owing to hardening. Therefore it is considered that the pore-sealing agent does not generate fine voids because it does not contract after it hardens, but hardens in a direction in which it further fills the voids.

It has been also found that in a spray deposit pore-sealed with the pore-sealing agent containing a diethylglutaric anhydride as its hardener, the permeability into pores (gaps) and the pore-filling performance are superior.

This is considered as follows: The pore-sealing agent which has penetrated into particle-particle boundaries owing to the excellent permeability and pore-filling performance of the diethylglutaric anhydride appropriately fills the particle-particle boundaries, adheres strongly to the particle-particle boundaries owing to its superior adhesive strength, and effectively restrains the generation of voids which is caused by the volatilization of a solvent. Thereby the pore-sealing can be accomplished until the state in which the gaps of the thermally spray deposit material are substantially entirely filled with the pore-sealing agent. The present invention has been completed based on the above-described finding.

The pore-sealing agent of the present invention for the spray deposit contains the epoxy group-containing component and the hardener and does not contain the polymerizable vinyl group-containing solvent.

The epoxy group-containing component that can be used for the pore-sealing agent of the present invention is a mixture containing the polyglycidyl ether compound in which the number of the epoxy groups contained in one molecule is not less than three as an essential component thereof and in addition to the essential component, an alkylenediglycidyl ether compound or/and a cyclic aliphatic diepoxy compound both of which contain two epoxy groups in one molecule thereof. The polyglycidyl ether compound and the cyclic aliphatic diepoxy compound do not contain in the molecules thereof a repeating unit which is formed by the cleavage of the oxirane ring. The mixture of the present invention reacts with the hardener to form the hardened substance.

As the polyglycidyl ether compound in which the number of the epoxy groups contained in one molecule is not less than three, a triglycidyl ether compound and a tetraglycidyl ether compound are listed.

As examples of the polyglycidyl ether compound, trimethylolpropanepolyglycidyl ether, glyceroltriglycidyl ether, and sorbitolpolyglycidyl ether are listed.

Of these polyglycidyl ether compounds, from the standpoint of decreasing the viscosity of the pore-sealing agent, the triglycidyl ether compound is favorable. The trimethylolpropanepolyglycidyl ether is especially favorable.

As the polyglycidyl ether compound in which the number of the epoxy groups contained in one molecule is two, it is possible to list neopentylglycoldiglycidyl ether, glyceroldiglycidyl ether, polyethyleneglycoldiglycidyl ether, polypropyleneglycoldiglycidyl ether, and 1,6-hexanediolglycidyl ether.

The cyclic aliphatic diepoxy compound in which the number of the epoxy groups contained in one molecule is two is a so-called alicyclic epoxy compound in which, in carbon atoms forming the ring of an alicyclic compound, adjacent two carbon atoms form the oxirane ring. As an alicyclic diepoxy compound containing two oxirane rings, for example, 1,2,8,9-diepoxylimonene is exemplified. The cyclic aliphatic diepoxy compound is preferable because it decreases the viscosity of the pore-sealing agent and effectively prevents the property of a treated material from deteriorating.

It is also possible to use diglycidyl ether of an alicyclic compound such as hydrogenated bisphenol A, diglycidyl ether of tetrahydrophthalate, and the like.

To improve the handleability of the pore-sealing agent of the present invention and the permeability thereof into the spray deposit material, the pore-sealing agent may contain a monoglycidyl ether compound in which the number of the epoxy groups contained in one molecule is one.

As a monoglycidyl ether compound in which the number of the epoxy groups contained in one molecule is one, it is possible to list alkylmonoglycidyl ether such as butylglycidyl ether; and known monoglycidyl ether compounds such as alkylphenolmonoglycidyl ether.

The triglycidyl ether compound can be used as a component of the pore-sealing agent which dramatically enhances the adhesive strength between the spray deposit and a metal base material. The viscosity of the triglycidyl ether compound is low. Thus by mixing it with a diglycidyl ether compound or the like which is described later, the triglycidyl ether compound is capable of imparting a sufficient permeability to the pore-sealing agent without the need of the addition of an organic solvent such as xylene, methyl ethyl ketone or the polymerizable vinyl group-containing solvent thereto.

By setting the amount of a chlorine ion contained in the resin to not more than 0.5 wt %, it is possible to restrain the deterioration of the electrical properties such as the insulation resistance thereof and the corrosion of the base material in a humid atmosphere.

It is preferable that the viscosity of the triglycidyl ether compound at 25° C. is not more than 500 mPa·s. When the viscosity thereof is more than 500 mPa·s, the triglycidyl ether compound has an inferior permeability.

The mixing ratio of the triglycidyl ether compound to the amount of the entire mixture is favorably 10 to 95 wt %, more favorably 10 to 80 wt %, and most favorably 20 to 50 wt %. When the mixing ratio of the triglycidyl ether compound to the amount of the entire mixture is less than 10 wt %, the permeability of the hardened substance can be enhanced because the viscosity of the pore-sealing liquid can be set low. But the adhesive strength of the pore-sealing agent to the base material decreases because it is difficult to obtain the effect of improving the adhesive strength of the triglycidyl ether compound. When the mixing ratio of the triglycidyl ether compound is more than 95 wt %, the viscosity of the pore-sealing agent becomes high except a case in which a diethylglutaric anhydride is used as the hardener. Therefore the pore-sealing agent has an inferior permeability.

The alkylenediglycidyl ether compound in which the number of the epoxy groups contained in one molecule is two is an epoxy compound having a low viscosity. Thus such alkylene diglycidyl ether compound is preferable because the alkylene diglycidyl ether compound is capable of decreasing the viscosity of the pore-sealing agent by the addition of the alkylenediglycidyl ether compound to the polyglycidyl ether. It is also preferable to add the cyclic aliphatic diepoxy compound such as 1,2,8,9-diepoxylimonene to the polyglycidyl ether compound. These compounds are preferable because they copolymerize with epoxy molecules at the time of a hardening reaction and thus they are capable of preventing the mixing-caused deterioration of the property of the hardened substance and a decrease in the volume thereof when it hardens.

It is preferable that the viscosity of the alkylenediglycidyl ether compound at 25° C. is not more than 30 mPa·s. When the viscosity thereof is more than 30 mPa·s, the viscosity of the comparison example rises. Thus the pore-sealing agent has an inferior permeability.

The mixing ratio of the alkylenediglycidyl ether compound and/or the cyclic aliphatic diepoxide to the amount of the entire mixture is favorably 10 to 90 wt %, more favorably 10 to 80 wt %, and most favorably 50 to 80 wt %. When the mixing ratio of the alkylenediglycidyl ether compound and/or the cyclic aliphatic diepoxide is less than 10 wt %, the effect of decreasing the viscosity of the pore-sealing agent is low.

Therefore the permeability of the pore-sealing agent cannot be enhanced. When the mixing ratio of the alkylenediglycidyl ether compound and/or the cyclic aliphatic diepoxide is more than 90 wt %, although the permeability of the pore-sealing agent can be enhanced, the mixing ratio of the triglycidyl ether compound having the role of forming a high-density crosslinking structure when the mixture hardens relatively decreases. Consequently the property of the epoxy resin deteriorates after it hardens.

By mixing a predetermined amount of the alkylenediglycidyl ether compound and/or the cyclic aliphatic diepoxide with the triglycidyl ether compound, the alkylenediglycidyl ether compound and/or the cyclic aliphatic diepoxide are capable of displaying a sufficient function as the pore-sealing agent for the spray deposit by securing the permeation degree of the pore-sealing agent without greatly decreasing the adhesive strength of the triglycidyl ether compound to the base material, the crosslinking density of molecules thereof, and the hardness of the resin.

The monoglycidyl ether compound in which the number of the epoxy groups contained in one molecule is one is capable of bonding a part of the resin through a mono-functional group. Because the monoglycidyl ether compound is an epoxy compound having a low viscosity, the monoglycidyl ether compound is capable of decreasing the viscosity of the pore-sealing agent. Further the monoglycidyl ether compound is capable of decreasing a residual stress inside the hardened resin and imparting the effect of adjusting the hardening speed.

It is preferable that the mixing ratio of the monoglycidyl ether compound to the amount of the entire mixture is set to 0 to 50 wt %.

When the mixing ratio of the monoglycidyl ether compound is more than 50 wt %, the volatile amount thereof increases, and the amount of the triglycidyl ether compound relatively decreases. Consequently the crosslinking density of the hardened resin is short. Consequently the property thereof greatly deteriorates, which makes it difficult to form the hardened substance. Further because the addition amount of the polyglycidyl ether compound also decreases, the adhesive strength between the spray deposit and the base material becomes low.

The epoxy group-containing component that can be used in the present invention is a mixture containing the polyglycidyl ether compound in which the number of the epoxy groups contained in one molecule is not less than three as the essential component thereof and at least one compound selected from among the alkylenediglycidyl ether compound or/and the cyclic aliphatic diepoxy compound both of which contain two epoxy groups in one molecule thereof. It is possible to use the epoxy group-containing component capable of containing the epoxy group in the range from 3.0 mmol to 4.0 mmol per gram of the pore-sealing agent.

When the mixing ratio of the epoxy group is out of the range of 3.0 mmol to 4.0 mmol, the adhesion of the pore-sealing agent to the base material is inferior.

That the epoxy group-containing component contains the epoxy group in the range from 3.0 mmol to 4.0 mmol per gram of the pore-sealing agent means that the epoxy group is set to $(3.0 \text{ to } 4.0) \times 10^{-3}$ equivalent/g.

The hardener is added to the epoxy group-containing component. As the hardener, it is possible to use known hardeners for epoxy resins: acid anhydrides; amine compounds such as aliphatic amine compounds, alicyclic amine compounds, and aromatic amine compounds; and imidazoles. The acid anhydrides can be used singly or in combination. The amine compounds can be also used singly or in combination.

In the present invention, as the hardener, the acid anhydrides are most favorable. When an acid anhydride-based hardener is selected as the hardener, an ester linkage is formed. This linkage having a high-polarity portion in its structure allows a strong adhesive action to be displayed between the pore-sealing agent and a member, treated with the pore-sealing agent, which is composed of ceramic or cermet and between the pore-sealing agent and bearing steel or cast iron treated therewith.

A ceramic material is frail. When a spray deposit is formed porously by thermal spraying the ceramic material, the spray deposit adheres to the base material by only an anchor effect. Therefore there is a fear that owing to a thermal stress and vibration generated during the use of a bearing or the like, the porous spray deposit easily separates from the base material. Even though the spray deposit does not separate therefrom, there is a danger of the generation of micro-crack. To solve this problem, by permeating a pore-sealing agent having a high adhesiveness into the spray deposit, it is possible to improve not only the adhesive strength between the base material and the spray deposit, but also the adhesive strength between the spray deposits.

As the acid anhydrides, it is possible to list phthalic anhydride, trimellitic anhydride, pyromellitic anhydride, benzophenonetetracarboxylic anhydride, ethylene glycol bistrimellitate, glycerol tristrimellitate, maleic anhydride, tetrahydrophthalicanhydride, methyltetrahydrophthalic anhydride, endomethylenetetrahydrophthalic anhydride, methylendomethylenetetrahydrophthalic anhydride, methylbutenyltetrahydrophthalic anhydride, succinic anhydride, dodecenylsuccinic anhydride, hexahydrophthalic anhydride, methylhexahydrophthalic anhydride, methylcyclohexenedicarboxylic anhydride, and derivatives thereof.

As amine compounds, it is possible to list chain aliphatic polyamine such as diethylenetriamine, triethylenetetramine; cyclic aliphatic polyamine such as N-aminoethylpipelazine, isohorondiamine; aliphatic aromatic amine such as xylene diamine; aromatic amine such as methaphenylenediamine, diaminodiphenylamine; and derivatives thereof.

Of these hardeners, the acid anhydride hardener whose viscosity is not more than 50 mPa·s at 25° C. and the aliphatic amine-based hardener whose viscosity is not more than 10 mPa·s at 25° C. are preferable hardeners because these hardeners are capable of outstandingly decreasing the viscosity of the entire pore-sealing agent by the addition of these hardeners to the epoxy group-containing component.

The acid anhydride hardener which is capable of making the pot life of the pore-sealing agent long, has a low contraction coefficient at a hardening time, and is liquid at a room temperature is preferable. For example, methyltetrahydrophthalic anhydride is exemplified.

The mixing amount of the acid anhydride hardener is preferably 0.80 to 0.95 equivalent for one equivalent of the epoxy group.

The other pore-sealing agent of the present invention for the spray deposit contains the epoxy group-containing component and the hardener. It is especially preferable to use the diethylglutaric anhydride as the hardener. The diethylglutaric anhydride has the ethyl ramification at the alpha-position carbon atom and the characteristic of a low viscosity and a low moisture-absorption owing to the ramification structure and is excellent in its operability, flowability, and compatibility with resin and a hardening accelerator. By using the diethylglutaric anhydride as the hardener in the present invention, the viscosity of the pore-sealing agent decreases. Thus the epoxy group-containing component and the hardener mix efficiently with each other, which allows a hardening reaction to progress promptly. Thus preferable pore sealing can be accomplished. As a product commercially available, DEGAN produced by KYOWA HAKKO CHEMICAL CO., LTD. can be exemplified.

It is possible to use the above-described known hardeners for epoxy resins such as the above-described known acid anhydrides, imidazoles, and the like singly or in combination.

When the diethylglutaric anhydride is used as the hardener, the mixing ratio of the triglycidyl ether compound to the amount of the entire mixture is favorably 10 to 95 wt % and more favorably 20 to 95 wt %. When the mixing ratio of the triglycidyl ether compound to the amount of the entire mixture is less than 10 wt %, it is possible to set a low viscosity for the pore-sealing liquid. Thus the permeability of the hardened substance can be enhanced. On the other hand, it is difficult to obtain the effect of improving the adhesive strength of the triglycidyl ether compound. Thus the adhesive strength of the pore-sealing agent to the base material deteriorates. When the mixing ratio of the triglycidyl ether compound to the amount of the entire mixture is more than 95 wt %, the viscosity of the pore-sealing agent becomes high. Thus the pore-sealing agent is inferior in its permeability.

The pore-sealing agent of the present invention may contain a surface active agent as other components thereof. As effective surface active agents, fluorine-based surface active agent and silicon-based surface active agent are listed. It is especially preferable to use the known fluorine-based surface active agent. In the present invention, it is possible to use anionic, cationic, nonionic, and amphoteric surface active agents. When the pore-sealing agent of the present invention contains the fluorine-based surface active agent, it is possible to use it singly or in combination of not less than two kinds thereof. It is also possible to use additives such as silicone oil capable of enhancing surface active and permeation effects within a range where they do not interrupt the characteristic of the present invention.

As the anionic surface active agent, it is possible to use sulfonate, sulfate, carboxylate, phosphate, phosphonate, organophosphate and the like. As the cationic surface active agent, it is possible to use quaternary ammonium salt, amino halogen salt, and the like. As the nonionic surface active agent, it is possible to use a polyoxyethylene ester type, a polyoxyethylene ether type, and a sorbitan ester type. As the amphoteric surface active agent, it is possible to use an imidazoline type and a betaine type.

In the pore-sealing method, pores of the spray deposit formed on the surface of the base material made of metal such as steel by thermally spraying the thermally sprayed material such as metal, alloy, oxide ceramics, carbide cermet to the surface of the base material by using a known thermal spray method are sealed with the pore-sealing agent of the present invention.

As the metals that can be used as the thermally sprayed material, it is possible to list Al, Zn, Cr, Ni, and the like. As the alloys that can be used as the thermally sprayed material, it is possible to use stainless steel and the like. As the oxide ceramics, it is possible to use alumina, zirconia, titania, and the like. As the carbide cermets, it is possible to use chromium carbide, tungsten carbide, and the like.

As the thermal spray method, it is possible to use a plasma thermal spray method, a high-speed gas flame thermal spray method, and the like. The thickness of the spray deposit can be appropriately set according to the kind of the thermally sprayed material and the use of an obtained member for coating the spray deposit. Supposing that carbon steel is used as the base material and that alumina is used as the thermally sprayed material, the thickness of the spray deposit is normally 20 to 2000 µm and preferably 50 to 1000 µm.

In the pore-sealing method, the permeability and pore-filling performance of the pore-sealing agent are determined by a particle-particle boundary fusing structure forming the spray deposit to be treated. Therefore it is desirable to select a pore-sealing agent optimum for the particle-particle boundary fusing structure of the spray deposit and for a characteristic demanded for the spray deposit after it is pore-sealed.

For example, it is preferable to use the pore-sealing agent of the present invention to seal pores of the spray deposit having a porosity of not more than 10%. It is preferable to use the pore-sealing agent of the present invention to seal pores of the spray deposit having a porosity of not more than 10%, which is formed by thermally spraying ceramic powder or carbide cermet or the like to the base material by using the plasma thermal spray method or the high-speed gas flame thermal spray method. When the spray deposit is pore-sealed by using the pore-sealing agent of the present invention, an excellent pore-sealing effect can be displayed. For example, when the surface of the spray deposit is ground in the depth of about 200 µm, an excellent pore-sealing effect can be confirmed.

As described above, by using the pore-sealing agent of the present invention, the pores (gaps) of the spray deposit is substantially entirely filled with the resin obtained by polymerizing the epoxy groups. Therefore it is possible to obtain the member for coating the spray deposit having a gap-free continuous coating surface.

That the pores of the spray deposit is "substantially entirely filled" means that the spray deposit is not colored in a dye penetration test based on JIS H8666, after grinding and abrading an outermost layer portion (for example, portion disposed in the depth of about 0.2 mm from the surface) of the spray deposit including a layer (composed of hardened substance of components contained in pore-sealing agent) formed with the pore-sealing agent which is present on the surface of the spray deposit in the configuration of a thin film.

In the pore-sealing method, because the pore-sealing agent permeates into the bottom of the spray deposit and the pore-filling performance of the pore-sealing agent is improved, the gaps of particle-particle boundaries are securely filled. Thereby there is an increase in an individual connection force between particles and in the adhesive strength of the spray deposit to the base material and all gaps of the particle-particle boundaries can be filled. Therefore environmental water in the atmosphere and foreign matters can be prevented from penetrating into the gaps, and without decreasing an inherent value of the spray deposit made of oxide ceramic, it is possible to restrain a decrease of the insulation resistance value and the dielectric breakdown value thereof. Further when the pore-sealed spray deposit is ground or abraded, there is no void exposed to the atmosphere.

Therefore the pore-sealing method can be utilized as means for enhancing the mechanical strength of the spray deposit and the adhesion strength of the spray deposit to the base material and means for decreasing and restraining the deterioration of the electrical properties thereof such as the insulation resistance value and the dielectric breakdown value thereof.

In sealing the pores of the spray deposit by using the pore-sealing agent of the present invention, after the gaps of the spray deposit are substantially entirely filled with the pore-sealing agent, a coating film-like thin layer of the pore-sealing agent is formed with the coating film-like thin layer masking the surface of the spray deposit. A member having the coating film-like thin layer can be used as it is. But to keep dimensional accuracy of the member, it is possible to remove the coating film-like thin layer by grinding and abrading the surface of the spray deposit with a grinding whetstone, a sheet of grinding paper, a nonwoven buff or the like.

It is preferable to seal the pores of the formed spray deposit immediately after the material for the spray deposit is sprayed. The spray deposit is formed of a large number of particles, having different diameters, which fuse to each other in only particle-particle boundary surfaces. Because the gaps are necessarily generated in the particle-particle boundaries, the spray deposit are much influenced by environmental conditions. For example, water and foreign matters penetrate into the spray deposit through gaps of the particle-particle boundaries immediately after the spray deposit is formed. Therefore to prevent the pore-sealing efficiency from deteriorating, it is desirable to perform the pore sealing of the spray deposit as soon as possible after the material for the spray deposit is thermally sprayed.

The member for coating the spray deposit of the present invention is obtained by the process that after forming the spray deposit by thermally spraying hard particles or powder of metal or ceramics to the surface of the base material of a mechanical component part composed of steel or the like, a pore-sealing operation is performed by using the pore-sealing agent of the present invention until the state in which the gaps of the spray deposit material are substantially entirely filled is obtained. Therefore the obtained member for coating the spray deposit has a high mechanical strength and a high adhesive strength to the base material. Further the base material of the mechanical component part is covered with the spray deposit which improves the electrical characteristics thereof such as the insulation resistance value and the dielectric breakdown value. Thus the mechanical component part is completely intercepted from a peripheral environment, the penetration of water and foreign matters thereinto is prevented, and the mechanical component part is protected.

It is possible to maintain the dimensional accuracy of the member for coating the spray deposit by grinding and abrading the surface of the spray deposit with a grinding whetstone, a sheet of abrading paper, a nonwoven buff or the like.

The member for coating the spray deposit of the present invention is preferably applicable to the surfaces of members constructing a bearing. The member for coating the spray deposit is applicable to both of a rolling bearing and a sliding bearing. The rolling bearing includes an inner ring having an inner ring rolling surface on its peripheral surface, an outer ring concentric with the inner ring and having an outer ring rolling surface on its inner peripheral surface, and a plurality of rolling elements disposed between the inner ring rolling surface and the outer ring rolling surface. The rolling bearing further includes a retainer holding the rolling elements and a sealing member fixed to the outer ring.

The member for coating the spray deposit of the present invention can be preferably used as the pore-sealing agent for a ceramic spray deposit applied to the outer ring of the rolling bearing such as a deep groove ball bearing and a cylindrical roller bearing/a tapered roller bearing and the like.

The bearing in which the surface of the outer ring has been treated with the member for coating the spray deposit is fixed by inserting the bearing into a housing by press fit with the outside surface of the outer ring sliding on the housing. By providing the bearing with the member for coating the spray deposit of the present invention, the spray deposit is reinforced owing to the action of the enclosed resin. Therefore it is possible to decrease a breakage risk of the spray deposit which is caused by collision between the bearing and the housing at the time of the press fit.

The member for coating the spray deposit of the present invention can be used as a sliding surface of a sliding bearing.

EXAMPLES

Examples 1 through 5 and Comparison Examples 1 through 7

The components shown in table 1 are shown below.
(1): A glycidyl ether compound or cyclic aliphatic diepoxy compound
(1-1): Trimethylolpropanetriglycidyl ether: produced by Nagase Chemtex corporation, Denacoal EX-32IL, viscosity: 500 mPa·s (25° C.)
(1-2): Phenylenediglycidyl ether: produced by Nagase Chemtex corporation, Denacoal EX-201, viscosity: 240 mPa·s (25° C.)
(1-3): Alkylenediglycidyl ether: produced by Japan Epoxy Resins Co., Ltd., YED216M, viscosity: 15 mPa·s (25° C.)
(1-4): Alkylenemonoglycidyl ether: produced by Japan Epoxy Resins Co., Ltd., YED111E, viscosity: 7 mPa·s (25° C.)
(1-5): Cyclic aliphatic diepoxy compound: produced by Daicel Chemical Industries, Ltd., Celoxide 3000, viscosity: 10 mPa·s (25° C.)
(2): Epoxy resin
(2-1): Bisphenol F-type epoxy resin: produced by Japan Epoxy Resins Co., Ltd., Epicoat 806, viscosity: 2000 mPa·s (25° C.)
(3): Hardener, hardening accelerator
(3-1): Acid anhydride-based hardener: produced by Dainippon Ink &Chemicals, Incorporated, Epicron B-570, viscosity: 40 mPa·s (25° C.)
(3-2): Imidazole-based hardening accelerator: produced by SHIKOKU CHEMICALS CORPORATION, OR-2E4MZ
(4): Polymerizable vinyl group-containing solvent
(4-1): Styrene monomer: produced by Wako Pure Chemical Industries, Ltd., reagent The components shown in table 1 were sufficiently stirred and mixed with one another at a room temperature. To release bubbles in a mixed resin, it was left for 30 minutes to obtain pore-sealing agents. The obtained pore-sealing agents were evaluated by conducting a weight loss ratio test after they were calcined.

<Test for Examining Weight Loss Ratio after Calcination>

About measured two grams of each of obtained pore-sealing agents was put into a foreign matter-unattached glass container (capacity: 3 ml) sufficiently dried in a condition of 140° C.×2 hours. In this manner, a measured value before calcination was set. Thereafter with an opening of the glass container open, each pore-sealing agent was pre-calcined in a condition of 80° C.×1 hour. Thereafter the pore-sealing agent was calcined in a condition of 120° C.×2 hours. The weight after the pore-sealing agent was calcined was measured. In this manner, a measured value after calcination was set. Based on the following equation, the weight loss ratio of the pore-sealing agent was computed. Table 1 shows the results of the measurement. When the weight loss ratio exceeded 1%, there is a fear that after the pore-sealing agent hardens, a slight void which remains in the spray deposit forms a void and that a generated gas causes the generation of a large amount of residual bubbles in a hardened substance. Thus as the judgement standard on the results of the measurement, pore-sealing agents whose weight loss ratios exceeded 1% were judged as "unapproved", whereas pore-sealing agents whose weight loss ratios were not more than 1% were judged as "approved".

"Unhardened" shown in table 1 indicates that the pore-sealing agent did not become solid in the above-described calcining condition.

Weight loss ratio (%) after calcination=100×(Measured value before calcination−Measured value after calcination)/Measured value before calcination <Deposit Formation and Surface Grinding>

Thereafter specimens of SUJ2 having a size of 020 mm×25 mm were prepared. A spray deposit of alumina ceramic having a thickness of 400 μm was formed on an end surface of each of the cylindrical specimens by using an atmospheric plasma thermal spray method.

In a room-temperature atmosphere, the pore-sealing agents shown in table 1 were applied to the surface of each spray deposit by using a brush made of polyamide. The pore-sealing agents were left for 30 minutes. Thereafter an excessive amount of each pore-sealing agent that attached to the surface of the spray deposit was scraped with a spatula made of polyethylene to obtain pore-sealing agent-applied specimens. Thereafter the pore-sealing agent-applied specimens were pre-calcined in the condition of 80° C.×1 hour and thereafter calcined in the condition of 120° C.×2 hours to harden the pore-sealing agents. In this manner, pore-sealing agent-hardened specimens were obtained. Thereafter the surface of each pore-sealing agent-hardened specimen was ground in parallel with the ceramic plane with a diamond whetstone to remove the resin. As the ground/removed amount of the resin of each pore-sealing agent-hardened specimen, the following two standards were set.

(1) To mainly remove a hardened resin layer of the surface of each pore-sealing agent-hardened specimen, a ceramic portion was ground by about 10 μm.

(2) To remove a resin-permeated layer in the depth of about 200 μm from the surface of each pore-sealing agent-hardened specimen, the pore-sealing agent-hardened specimens were ground by about 200 μm to obtain specimens ground by 200 μm.

The permeability, adhesive strength, insulation resistance value, and withstand voltage of each ground specimen were measured in a permeability test, an adhesive strength test, an insulation resistance test, and a withstand voltage property test respectively.

<Permeability Test>

The permeability test for each ground specimen was conducted by applying a ferroxyl test based on JIS H8666 to the surface of the spray deposit of each pore-sealed pore-sealing agent-hardened specimen. FIG. 1 shows the outline of the ferroxyl test. Except that the configuration (φ16 mm) of a filter paper 3 dipped in a test liquid, a tin plate 4, and a weight 5 all of which are shown in FIG. 1 were conformed to that of the specimen, conditions of the composition of the test liquid, a surface pressure to be examined, and the period of time in which the specimens were left were conformed to those of JIS H8666. Coloring of the filter paper 3 indicates that because a spray deposit 2 had an interconnected pore interconnecting a ground specimen base material 1 and an exterior space with each other, a ferroxyl test solution contacted an iron ion of the specimen base material 1 and displayed blue. As the criterion, when not less than one blue spot was visible on the surface of the filter paper 3 which was originally white, the ground specimen 1 was regarded as "spotted", whereas when no blue spot was visible on the surface of the filter paper 3, the ground specimen 1 was regarded as "unspotted". Table 1 shows the results of the measurement of the permeability.

<Test for Examining Adhesive Strength>

FIG. 2 shows the outline of the adhesive strength test. A pulling jig 6 (configuration of bonded portion: φ16 mm) was bonded to an epoxy bonding surface 2a of the calcined ground specimen from which the surface was ground by 200 μm through a high-viscosity epoxy-based adhesive agent. The ground specimen was pulled by a pulling compression testing machine in the direction shown by the arrow to measure the adhesion of the spray deposit 2 per area. Table 1 shows the results of the measurement. As the criterion, the ground specimens having the adhesive strength not less than 2 MPa was judged as "approved", whereas the ground specimens having the adhesive strength less than 2 MPa was judged as "unapproved".

<Insulation Resistance Test>

FIG. 4 shows the outline of the insulation resistance test. After the pore-sealing agent-hardened specimen was immersed for one hour in hot water having a temperature of 80° C., an insulation resistance between the surface of the spray deposit 2 and the specimen base material 1 was measured by using a 1000 V DC insulation resistance meter 8 mounted on a wiring 9. Reference numeral 7 denotes an electrode. Table 1 shows the results of the measurement. As the criterion, pore-sealing agent-hardened specimens having a resistivity not less than 2000 MΩ (shown as >2000 in table 1) were judged as "approved", whereas pore-sealing agent-hardened specimens having a resistivity less than 2000 MΩ were judged as "unapproved".

<Withstand Voltage Property Test>

FIG. 5 shows the outline of the withstand voltage property test. A voltage of DC 5 kV was applied by a high-voltage generation apparatus 10 mounted on the wiring 9 disposed between the spray deposit 2 and the ground specimen base material 1 to evaluate the withstand voltage property by using a monitor 11. Reference numeral 7 denotes the electrode. Table 1 shows the results of the measurement. As the criterion, when DC 5 kV was applied thereto for five minutes, ground specimens which did not generate a dielectric breakdown were judged as "approved", whereas ground specimens which generated a dielectric breakdown were judged as "unapproved".

TABLE 1

|  | Example | | | | |
| --- | --- | --- | --- | --- | --- |
|  | 1 | 2 | 3 | 4 | 5 |
| Mixing ratio of pore-sealing agent (part by weight) | | | | | |
| (1-1) | 10 | 50 | 80 | 40 | 50 |
| (1-3) | 90 | 50 | 20 | 40 | — |
| (1-5) | — | — | — | — | 50 |
| (2-1) | — | — | — | — | — |
| (1-2) | — | — | — | — | — |

TABLE 1-continued

|  |  |  |  |  |  |
|---|---|---|---|---|---|
| (1-4) | — | — | — | 20 | — |
| (4-1) | — | — | — | — | — |
| Sub-total | 100 | 100 | 100 | 100 | 100 |
| (3-1) | Equivalent 0.9 times | Equivalent 0.9 times | Equivalent 0.9 times | Equivalent 0.9 times | Equivalent 0.9 times |
| (3-2) | 1 | 1 | 1 | 1 | 1 |
| Evaluation of properties |  |  |  |  |  |
| Weight loss ratio (%) after calcination | 0.8 | 0.3 | 0.1 | 0.3 | 0.5 |
| Specimen ground by 10 μm |  |  |  |  |  |
| Permeability | Unspotted | Unspotted | Unspotted | Unspotted | Unspotted |
| Adhesive strength (MPa) | 2.4 | 2.8 | 3.1 | 2.5 | 2.7 |
| Insulation resistance value (MΩ) | >2000 | >2000 | >2000 | >2000 | >2000 |
| Withstand voltage property (kV) | Approved | Approved | Approved | Approved | Approved |
| Specimen ground by 200 μm |  |  |  |  |  |
| Permeability | Unspotted | Unspotted | Unspotted | Unspotted | Unspotted |
| Adhesive strength (MPa) | 2.2 | 2.4 | 2.8 | 2.6 | 2.5 |
| Insulation resistance value (MΩ) | >2000 | >2000 | >2000 | >2000 | >2000 |
| Withstand voltage property (kV) | Approved | Approved | Approved | Approved | Approved |
| Over-all judgement | ○ | ○ | ○ | ○ | ○ |

|  | Comparison example |  |  |  |  |  |  |
|---|---|---|---|---|---|---|---|
|  | 1 | 2 | 3 | 4 | 5 | 6 | 7 |
| Mixing ratio of pore-sealing agent (part by weight) |  |  |  |  |  |  |  |
| (1-1) | — | 5 | 95 | 30 | 30 | 5 | 50 |
| (1-3) | 80 | 95 | 5 | — | — | 35 | — |
| (1-5) | — | — | — | — | — | — | — |
| (2-1) | — | — | — | 50 | — | — | — |
| (1-2) | — | — | — | — | 50 | — | — |
| (1-4) | 20 | — | — | 20 | 20 | 60 | — |
| (4-1) | — | — | — | — | — | — | 50 |
| Sub-total | 100 | 100 | 100 | 100 | 100 | 100 | 100 |
| (3-1) | Equivalent 0.9 times | Equivalent 0.9 times | Equivalent 0.9 times | Equivalent 0.9 times | Equivalent 0.9 times | Equivalent 0.9 times | Equivalent 0.9 times |
| (3-2) | 1 | 1 | 1 | 1 | 1 | 1 | 1 |
| Evaluation of properties |  |  |  |  |  |  |  |
| Weight loss ratio (%) after calcination | Unhardened | 1.3 | 0.1 | 0.1 | 0.1 | 1.8 | 2.1 |
| Specimen ground by 10 μm |  |  |  |  |  |  |  |
| Permeability | Unjudgeable | Unspotted | Unspotted | Unspotted | Unspotted | Unspotted | Unspotted |
| Adhesive strength (MPa) | Unjudgeable | 2.2 | 2.8 | 2.1 | 2.6 | 2.0 | 2.1 |
| Insulation resistance value (MΩ) | Unjudgeable | >2000 | >2000 | >2000 | >2000 | >2000 | >2000 |
| Withstand voltage property (kV) | Unjudgeable | Approved | Approved | Approved | Approved | Approved | Approved |
| Specimen ground by 200 μm |  |  |  |  |  |  |  |
| Permeability | Unjudgeable | Unspotted | Spotted | Spotted | Spotted | Unspotted | Unspotted |
| Adhesive strength (MPa) | Unjudgeable | 0.6 | 0.5 | 0.2 | 2.1 | 0.4 | 2.3 |
| Insulation resistance value (MΩ) | Unjudgeable | >2000 | <1 | <1 | <1 | >2000 | >2000 |
| Withstand voltage property (kV) | Unjudgeable | Unapproved | Unapproved | Unapproved | Unapproved | Unapproved | Unapproved |
| Over-all judgement | X | X | X | X | X | X | X |

As shown in table 1, the weight loss ratio of the pore-sealing agent of each example was less than 1%. The pore-sealing agent of each of the comparison examples 2, 6, and 7 contains a large amount of a bifunctional epoxy component and a mono-functional epoxy component, both of which volatilize comparatively readily. Therefore the pore-sealing agent of each of the comparison examples 2, 6, and 7 did not have any problems in the permeability thereof, but after hardening, compounds of the pore-sealing agents had defects and the properties thereof deteriorated. The pore-sealing agent of the comparison examples 2, 6 contained a small amount of a trifunctional epoxy component having the role of forming a high-density crosslinking point in a hardened substance. Therefore owing to the heat value at the heating time and the reaction heat generated at the hardening reaction time, the volatilization of the bifunctional and mono-functional epoxy components progressed. The pore-sealing agent of the comparison example 1 did not form a hardened substance in the hardening condition.

In the case where the grinding/ground/removed amount was 200 μm, the adhesive strengths of the pore-sealed specimens of the examples were higher than those of the specimens of the comparison examples except those of the specimens of the comparison examples 5, 7. It is conceivable that owing to the composition of the pore-sealing agent of the present invention, the pore-sealing agent filled pores (gaps) of the spray deposit and in addition permeated to the interface between the spray deposit and the specimen base material and effectively displayed its inherent adhesiveness.

In the case where the ground amount was 200 μm, the insulation resistance value of the specimen of each example was not less than 2000 MΩ, whereas those of the specimens of the comparison examples 3, 4, and 5 were not more than 1 MΩ. In the examples, a conductive phenomenon which occurs owing to the penetration of water into the spray deposit was prevented by the pore sealing. Thereby the insulation resistance value of the alumina was restrained from decreasing. In the comparison example 5, a hardened substance could be formed. Because the bifunctional epoxy compound used in the comparison example 5 was a high-viscosity aromatic epoxy compound, the pore-sealing agent did not permeate to the interface between the specimen base material and the spray deposit. In the comparison examples 2, 6, because the viscosity was sufficiently low, the permeability was secured and thus the penetration of water into the spray deposit could be prevented. But the amount of the trifunctional glycidyl ether group was small. Thus a sufficient adhesive strength could not be obtained.

The specimen of each example maintained the insulating properties stably for 10 minutes, whereas all of the specimens of the comparison examples generated a spark discharge immediately after the application of a voltage and generated an electrical breakdown.

Examples 6 through 8 and Comparison Examples 8 through 10

The components shown in table 2 were sufficiently stirred at a room temperature. Thereafter to release bubbles in a mixture, the mixture was left for 30 minutes to obtain a pore-sealing agent of each example. The materials shown in table 2 correspond to those shown in table 1. The specific gravity of each of the obtained pore-sealing agents before and after they hardened were measured to evaluate each pore-sealing agent in terms of the ratio of the density after the pore-sealing agent hardened to the density before the pore-sealing agent hardened. Table 2 shows the results of the measurement.

<Density Ratio of Pore-Sealing Agent Before and after Hardening>

Before computation is performed, the density of each unhardened pore-sealing agent was measured in accordance with the measuring method using a specific gravity cup described in JIS K6833 (Method of examining solventless liquid resin for electric insulation). The obtained specific gravity was set as the density (unit: g/cm$^3$) before hardening. About 20 grams of each of the obtained pore-sealing agents was put into a clean container (capacity: 30 ml) of PP to which foreign matters such as dust, oil, and the like did not attach. Thereafter with an opening of the container open, each pore-sealing agent was pre-calcined in the condition of 80° C.×1 hour. Thereafter the pore-sealing agents were calcined in the condition of 120° C.×2 hours to obtain pore-sealing agent-hardened specimens. Thereafter cubic blocks of 10 mm×10 mm×10 mm were prepared by machining. The specific gravity of each block was measured in accordance with the method described in JIS K6911 "Method of testing thermosetting plastic". The obtained specific gravity was set as the density (unit: g/cm$^3$) after hardening.

By using the obtained densities before and after the pore-sealing agent hardened, the ratio between the density after the pore-sealing agent hardened and the density before the pore-sealing agent hardened was computed based on the following equation:

The ratio between the density after the pore-sealing agent hardened and the density before the pore-sealing agent=density after hardening/density before hardening <Deposit Formation and Surface Grinding>

Thereafter specimens of SUJ2 having a size of φ20 mm×25 mm were prepared. A spray deposit of alumina ceramic having a thickness of 400 μm was formed on an end surface of each of the cylindrical specimens by using an atmospheric plasma thermal spray method.

In a room-temperature atmosphere, the pore-sealing agents shown in table 2 were applied to the surface of each spray deposit by using a brush made of polyamide. The pore-sealing agents were left for 30 minutes. Thereafter an excessive amount of each pore-sealing agent that attached to the surface of the spray deposit was scraped with a spatula made of polyethylene to obtain pore-sealing agent-applied specimens. Thereafter the pore-sealing agent-applied specimens were pre-calcined in the condition of 80° C.×1 hour and thereafter calcined in the condition of 120° C.×2 hours to harden the pore-sealing agents. In this manner, pore-sealing agent-hardened specimens were obtained. Thereafter the surface of each pore-sealing agent-hardened specimen was ground in parallel with the ceramic plane with a diamond whetstone to remove the resin. As the ground/removed amount of the resin of each pore-sealing agent-hardened specimen, the following two standards were set.

(1) To mainly remove a hardened resin layer of the surface of each pore-sealing agent-hardened specimen, a ceramic portion was ground by about 10 μm to obtain specimens ground by 10 μm.

(2) To remove a resin-permeated layer in the depth of about 200 μm from the surface of each pore-sealing agent-hardened specimen, the pore-sealing agent-hardened specimens were ground by about 200 μm to obtain specimens ground by 200 μm.

Thereafter a heat cycle treatment or a leaving at high temperature shown below was conducted on these ground specimens.

<Heat Cycle Treatment>

After the specimens ground by 10 μm and the specimens ground by 200 μm were left for one hour at −20° C., they were left for one hour at 120° C. This series of treatment was set as one cycle. 500 cycles of the above-described treatment was carried out to obtain specimens subjected to heat cycle treatment.

<Treatment of Leaving Specimen at High Temperature>

The specimens ground by 10 μm and the specimens ground by 200 μm were left for 5000 hours at 150° C. to obtain specimens left at high temperature.

In a method similar to that used in the example 1, the permeability test, the insulation resistance test, and the withstand voltage property test were conducted on the obtained specimens subjected to the heat cycle and the obtained specimens left at high temperature (hereinafter referred to as ground and thermally treated specimen) to evaluate the durability of the specimens ground by 10 μm and the specimens ground by 200 μm in the heat cycle treatment and the treatment of leaving the specimens at high temperature. The permeability test, the insulation resistance test, and the withstand voltage property test were conducted by replacing the ground specimens 1 with the ground and thermally treated specimens 1. Table 2 shows the results.

TABLE 2

| | Judgement standard for approval | Example 6 | Example 7 | Example 8 |
|---|---|---|---|---|
| Mixing ratio of pore-sealing agent (weight by part) | | | | |
| (1-1) | | 10 | 40 | 50 |
| (1-3) | | 90 | 40 | 0 |
| (1-4) | | 0 | 20 | 0 |
| (1-5) | | 0 | 0 | 50 |
| (4-1) | | 0 | 0 | 0 |
| Sub-total | | 100 | 100 | 100 |
| (3-1) | | Equivalent 0.9 times | Equivalent 0.9 times | Equivalent 0.9 times |
| (3-2) | | 1 | 1 | 1 |
| Ratio of density of pore-sealing agent after hardening to density thereof before hardening | not more than 1 | 0.93 | 0.97 | 0.99 |
| Evaluation of properties after heat cycle treatment Specimen ground by 10 μm | | | | |
| Permeability | Unspotted | Unspotted | Unspotted | Unspotted |
| Insulation resistance value (MΩ) | not less than 2000 | >2000 | >2000 | >2000 |
| Withstand voltage property (kV) | 5 kV × 5 minutes | Approved | Approved | Approved |
| Specimen ground by 200 μm | | | | |
| Permeability | Unspotted | Unspotted | Unspotted | Unspotted |
| Insulation resistance value (MΩ) | not less than 2000 | >2000 | >2000 | >2000 |
| Withstand voltage property (kV) | 5 kV × 5 minutes | Approved | Approved | Approved |
| Evaluation of properties after treatment at high temperature Specimen ground by 10 μm | | | | |
| Permeability | Unspotted | Unspotted | Unspotted | Unspotted |
| Insulation resistance value (MΩ) | not less than 2000 | >2000 | >2000 | >2000 |
| Withstand voltage property (kV) | 5 kV × 5 minutes | Approved | Approved | Approved |
| Specimen ground by 200 μm | | | | |
| Permeability | Unspotted | Unspotted | Unspotted | Unspotted |
| Insulation resistance value (MΩ) | not less than 2000 | >2000 | >2000 | >2000 |
| Withstand voltage property (kV) | 5 kV × 5 minutes | Approved | Approved | Approved |
| Over-all judgement | | ○ | ○ | ○ |

| | Judgement standard for approval | Comparison example 8 | Comparison example 9 | Comparison example 10 |
|---|---|---|---|---|
| Mixing ratio of pore-sealing agent (weight by part) | | | | |
| (1-1) | | 5 | 5 | 50 |
| (1-3) | | 95 | 35 | 0 |
| (1-4) | | 0 | 60 | 0 |
| (1-5) | | 0 | 0 | 0 |
| (4-1) | | 0 | 0 | 50 |
| Sub-total | | 100 | 100 | 100 |
| (3-1) | | Equivalent 0.9 times | Equivalent 0.9 times | Equivalent 0.9 times |
| (3-2) | | 1 | 1 | 1 |
| Ratio of density of pore-sealing agent after hardening to density thereof before hardening | not more than 1 | 1.04 | 1.07 | 1.09 |
| Evaluation of properties after heat cycle treatment Specimen ground by 10 μm | | | | |
| Permeability | Unspotted | Spotted | Spotted | Spotted |
| Insulation resistance value (MΩ) | not less than 2000 | >2000 | >2000 | >2000 |
| Withstand voltage property (kV) | 5 kV × 5 minutes | Approved | Approved | Approved |
| Specimen ground by 200 μm | | | | |
| Permeability | Unspotted | Spotted | Spotted | Spotted |
| Insulation resistance value (MΩ) | not less than 2000 | 120 | 90 | 450 |
| Withstand voltage property (kV) | 5 kV × 5 minutes | Unapproved | Unapproved | Unapproved |
| Evaluation of properties after treatment at high temperature Specimen ground by 10 μm | | | | |
| Permeability | Unspotted | Spotted | Spotted | Spotted |
| Insulation resistance value (MΩ) | not less than 2000 | 1500 | 1450 | 1010 |
| Withstand voltage property (kV) | 5 kV × 5 minutes | Unapproved | Unapproved | Unapproved |

TABLE 2-continued

| | Specimen ground by 200 μm | | | |
|---|---|---|---|---|
| Permeability | Unspotted | Spotted | Spotted | Spotted |
| Insulation resistance value (MΩ) | not less than 2000 | 10 | 20 | 2 |
| Withstand voltage property (kV) | 5 kV × 5 minutes | Unapproved | Unapproved | Unapproved |
| Over-all judgement | | X | X | X |

As shown in table 2, in the pore-sealing agents of the examples, the ratio of the density after hardening to the density before hardening was below one. The pore-sealing agent of each of the comparison examples contained a comparatively large amount of the bifunctional epoxy component, the monofunctional epoxy component, and the styrene monomer which is highly volatile. Thus the pore-sealing agents had a large volume contraction when they hardened. Therefore the ratio of the density after hardening to the density before hardening exceeded one.

In the specimens of each comparison example ground by 200 μm, the insulation resistance value and the withstand voltage property after the specimens were subjected to the heat cycle treatment and the leaving at high temperature were "unapproved". This is for the reason described below: Owing to the heat cycle treatment and the leaving at high temperature, the hardening and contraction of the pore-sealing agent progressed. After the pore-sealing agent hardened, slight gaps were formed in the interface between the pore-sealing agent and pores inside the spray deposit. Water present in the atmosphere and in the test of immersing the pore-sealing agent-hardened specimen in hot water penetrated into the voids.

The above-described test results indicate that by filling the pores (gaps) of the spray deposit with the pore-sealing agent of the present invention, the gaps in the spray deposit can be effectively filled with the pore-sealing agent, and further in a long-term thermal history (heat cycle, leaving of specimen at high temperature), hardening and contraction do not progress. Thus it is possible to prevent the penetration of water from outside for a long time. Consequently without decreasing the inherent value of the oxide ceramic spray deposit, it is possible to restrain a decrease of the insulation resistance value and the withstand voltage property.

Examples 9 through 12 and Comparison Examples 11 through 13

The components shown in table 3 were sufficiently stirred and mixed with one another at a room temperature. To release bubbles in each mixture, it was left for 30 minutes to obtain pore-sealing agents. The materials shown in table 3 correspond to those shown in table 1.

<Deposit Formation and Surface Grinding>

Thereafter specimens of SUJ2 having a size of ϕ20 mm×25 mm were prepared. A spray deposit of alumina ceramic having a thickness of 400 μm was formed on an end surface of each of the cylindrical specimens by using an atmospheric plasma thermal spray method.

In a room-temperature atmosphere, the pore-sealing agents shown in table 3 were applied to the surface of each spray deposit by using a brush made of polyamide. The pore-sealing agents were left for 30 minutes. Thereafter an excessive amount of each pore-sealing agent that attached to the surface of the spray deposit was scraped with a spatula made of polyethylene to obtain pore-sealing agent-applied specimens. Thereafter the pore-sealing agent-applied specimens were pre-calcined in the condition of 80° C.×1 hour and thereafter calcined in the condition of 120° C.×2 hours to harden the pore-sealing agents. In this manner, pore-sealing agent-hardened specimens were obtained. Thereafter the surface of each pore-sealing agent-hardened specimen was ground in parallel with the ceramic plane with a diamond whetstone to remove the resin. The specimen subject to hardening treatment was ground to a surface depth of about 200 μm.

After the ground specimens obtained by grinding the surface of each of the pore-sealing agent-hardened specimens were left for one hour at −20° C., they were left for one hour at 12° C. This series of treatment was set as one cycle. 500 cycles of the above-described treatment was carried out to obtain specimens subjected to heat cycle treatment. Different ground specimens were left for 5000 hours at 150° C. to obtain specimens left at high temperature.

An adhesive strength test shown below was conducted on the obtained specimens subjected to heat cycle treatment and the specimens left at high temperature to evaluate the durability of the specimens in the heat cycle treatment and the treatment of leaving them at high temperature.

<Test for Examining Adhesive Strength>

FIG. 2 shows the outline of the adhesive strength test. A pulling jig 6 (configuration of bonded portion: ϕ16 mm) was bonded to an epoxy bonding surface 2a of the calcined pore-sealing agent-hardened specimen 1 from which the surface was ground by 200 μm through a high-viscosity epoxy-based adhesive agent. The ground specimen was pulled by a pulling compression testing machine in the direction shown by the arrow to measure the adhesion of the spray deposit 2 per area. Table 3 and FIG. 3 show the results of the measurement. As the criterion, the ground specimens having the adhesive strength not less than 2 MPa was judged as "approved", whereas the ground specimens having the adhesive strength less than 2 MPa was judged as "unapproved".

TABLE 3

| | | Judgement standard for approval | Example | | | |
|---|---|---|---|---|---|---|
| | | | 9 | 10 | 11 | 12 |
| Mixing ratio of pore-sealing agent (weight by part) | [equivalent of epoxy group, g/eq.] | | | | | |
| (1-1) | [126] | — | 10 | 80 | 40 | 50 |
| (1-3) | [144] | — | 90 | 20 | 40 | — |
| (1-4) | [282] | — | — | — | 20 | — |

TABLE 3-continued

|  |  |  |  |  |  |  |
|---|---|---|---|---|---|---|
| (1-5) | [84] | — | — | — | — | 50 |
| (4-1) | — | — | — | — | — | — |
| Sub-total |  |  | 100 | 100 | 100 | 100 |
| (3-1) | — | — | 105.2 | 115.6 | 99.5 | 148.2 |
| (3-2) | — | — | 1 | 1 | 1 | 1 |
| Total |  |  | 206.2 | 216.6 | 200.5 | 249.2 |
| Mixing amount of epoxy group (mmol/g) |  | 3~4 | 3.42 | 3.57 | 3.32 | 3.98 |
| Adhesive strength (MPa) |  |  |  |  |  |  |
| After heat cycle treatment |  | not less than 2 | 2.7 | 3.0 | 2.3 | 2.1 |
| After treatment at high temperature |  | not less than 2 | 2.3 | 2.8 | 2.2 | 2.4 |
| Over-all judgement |  |  | ○ | ○ | ○ | ○ |

|  |  | Judgement standard for approval | Comparison Example | | |
|---|---|---|---|---|---|
|  |  |  | 11 | 12 | 13 |
| Mixing ratio of pore-sealing agent (weight by part) | [equivalent of epoxy group, g/eq.] |  |  |  |  |
| (1-1) | [126] | — | 5 | 50 | — |
| (1-3) | [144] | — | 35 | — | — |
| (1-4) | [282] | — | 60 | — | — |
| (1-5) | [84] | — | — | — | 100 |
| (4-1) | — | — | — | 50 | — |
| Sub-total |  |  | 100 | 100 | 100 |
| (3-1) | — | — | 74.0 | 59.3 | 177.9 |
| (3-2) | — | — | 1 | 1 | 1 |
| Total |  |  | 175 | 160.3 | 278.9 |
| Mixing amount of epoxy group (mmol/g) |  | 3~4 | 2.83 | 2.48 | 4.27 |
| Adhesive strength (MPa) |  |  |  |  |  |
| After heat cycle treatment |  | not less than 2 | 1.8 | 1.3 | 1.6 |
| After treatment at high temperature |  | not less than 2 | 1.7 | 1.1 | 1.4 |
| Over-all judgement |  |  | X | X | X |

As shown in table 3 and FIG. 3, by setting the mixing amount of the epoxy group for the pore-sealing agent of each example to the range from 3.0 to 4.0 mmol/g, the adhesive strength exceeded 2 MPa after the heat cycle treatment and after they were left at high temperature.

The adhesive strength of the specimen of each comparison example after the heat cycle test and they were left at high temperature was "unapproved". This is because when the amount of the epoxy group-containing component contained in the pore-sealing agent was less than 3.0 mmol/g, a polar group effective for improving the adhesion of the pore-sealing agent to the base material is relatively short and the adhesive strength deteriorated. As the amount of the epoxy group-containing component increases, and especially when the amount of the epoxy group-containing component is more than 4.0 mmol/g, the amount of a rigid epoxy bond portion in the hardened substance is excessive. As a result, the toughness of the hardened substance greatly deteriorates, and micro-crack is easily generated by a thermal stress applied between the spray deposit and the base material in the test of leaving the specimen at high temperature and the heat cycle test. Consequently an cohesive failure is caused at a small load.

The components shown in table 4 were sufficiently stirred and mixed with one another at a room temperature. To release bubbles in a mixed resin, it was left for 30 minutes to obtain pore-sealing agents. The materials shown in table 4 correspond to those shown in table 1. As the glutaric anhydride serving as the hardener, (3-3) acid anhydride-based hardener: DEGAN produced by KYOWA HAKKO CHEMICAL CO., LTD., viscosity: 14 mPa·s (25° C.) was used. In a method similar to that used in the example 1, a weight loss ratio test was conducted after calcination to evaluate the obtained pore-sealing agents. Table 4 shows the results.

<Deposit Formation and Surface Grinding>

Thereafter specimens of SUJ2 having a size of ø20 mm×25 mm were prepared. A spray deposit of alumina ceramic having a thickness of 400 μm was formed on an end surface of each of the cylindrical specimens by using an atmospheric plasma thermal spray method.

In a room-temperature atmosphere, the pore-sealing agents shown in table 4 were applied to the surface of each spray deposit by using a brush made of polyamide. The pore-sealing agents were left for 30 minutes. Thereafter an excessive amount of each pore-sealing agent that attached to the surface of the thermally spray film was scraped with a spatula made of polyethylene to obtain pore-sealing agent-applied specimens. Thereafter the pore-sealing agent-applied specimens were pre-calcined in the condition of 80° C.×1 hour and thereafter calcined in the condition of 120° C.×2 hours to harden the pore-sealing agents. In this manner, pore-sealing agent-hardened specimens were obtained. Thereafter the surface of each pore-sealing agent-hardened specimen was ground in parallel with the ceramic plane with a diamond whetstone to remove the resin. As the ground/removed amount of the resin of each pore-sealing agent-hardened specimen, the following two standards were set.

(1) To mainly remove a hardened resin layer of the surface of each pore-sealing agent-hardened specimen, a ceramic portion was ground by about 10 μm to obtain specimens ground by 10 μm.
(2) To remove a resin-permeated layer in the depth of about 200 μm from the surface of each pore-sealing agent-hardened specimen, the pore-sealing agent-hardened specimens were ground by about 200 μm to obtain specimens ground by 200 μm.

In a method similar to that used in the example 1, the permeability, adhesive strength, insulation resistance value, and withstand voltage of the obtained specimens ground by 10 μm and the obtained specimens ground by 200 μm (these specimens are hereinafter shown as ground specimen) were measured in a permeability test, an adhesive strength test, an insulation resistance test, and a withstand voltage property test respectively. Table 4 shows the results.

In a method similar to that used in the example 6, heat cycle treatment of the specimens subjected to grinding treatment or treatment of leaving the specimens at high temperature were conducted.

In a method similar to that used in the example 1, the insulation resistance value and withstand voltage of the obtained specimens subjected to the heat cycle treatment and left at high temperature were measured in the insulation resistance test and the withstand voltage property test respectively. At that time, the insulation resistance test and the withstand voltage property test were conducted by replacing the ground specimens 1 with the ground and thermally treated specimens 1. Table 4 shows the results.

TABLE 4

| | | Judgement standard for approval | Example 13 | Example 14 | Example 15 |
|---|---|---|---|---|---|
| Mixing ratio of pore-sealing agent (g) | [Equivalent of epoxy group, g/eq.] | | | | |
| (1-1) | [126] | — | 95 | 30 | 30 |
| (1-3) | [144] | — | 5 | — | — |
| (2-1) | [167] | — | — | 50 | — |
| (1-2) | [117] | — | — | — | 50 |
| (1-4) | [282] | — | — | 20 | 20 |
| Sub-total of main component | | — | 100 | 100 | 100 |
| (3-3) | | — | 120.67 | 93.09 | 112.66 |
| (3-2) | | — | 1 | 1 | 1 |
| Total of pore-sealing agent used (g) | | — | 221.67 | 194.09 | 213.66 |
| Weight loss ratio (%) of pore-sealing agent after calcination | | not more than 1 | 0.1 | 0.1 | 0.1 |
| Specimen ground by 10 μm | | | | | |
| Permeability | | Unspotted | Unspotted | Unspotted | Unspotted |
| Adhesive strength (MPa) | | not less than 2 | 2.8 | 2.1 | 2.6 |
| Insulation resistance value (MΩ) | | not less than 2000 | >2000 | >2000 | >2000 |
| Withstand voltage property (kV) | | 5 kV × 5 minutes | Approved | Approved | Approved |
| Evaluation of properties after heat cycle treatment | | | | | |
| Insulation resistance value (MΩ) | | not less than 2000 | >2000 | >2000 | >2000 |
| Withstand voltage property (kV) | | 5 kV × 5 minutes | Approved | Approved | Approved |
| Evaluation of properties after treatment at high temperature | | | | | |
| Insulation resistance value (MΩ) | | not less than 2000 | >2000 | >2000 | >2000 |
| Withstand voltage property (kV) | | 5 kV × 5 minutes | Approved | Approved | Approved |

| | Judgement standard for approval | Example 13 | Example 14 | Example 15 |
|---|---|---|---|---|
| Specimen ground by 200 μm | | | | |
| Permeability | Unspotted | Unspotted | Unspotted | Unspotted |
| Adhesive strength (MPa) | not less than 2 | 2.6 | 2.1 | 2.2 |
| Insulation resistance value (MΩ) | not less than 2000 | >2000 | >2000 | >2000 |
| Withstand voltage property (kV) | 5 kV × 5 minutes | Approved | Approved | Approved |
| Evaluation of properties after heat cycle treatment | | | | |
| Insulation resistance value (MΩ) | not less than 2000 | >2000 | >2000 | >2000 |
| Withstand voltage property (kV) | 5 kV × 5 minutes | Approved | Approved | Approved |
| Evaluation of properties after treatment at high temperature | | | | |
| Insulation resistance value (MΩ) | not less than 2000 | >2000 | >2000 | >2000 |
| Withstand voltage property (kV) | 5 kV × 5 minutes | Approved | Approved | Approved |
| Over-all judgement | | ◯ | ◯ | ◯ |

As shown in table 4, the pore-sealing agents of the examples had weight loss ratio at less than 1%. In the pore-sealing agent of each of the examples, by using the diethylglutaric anhydride as the hardener, the effect of decreasing the viscosity of the entire pore-sealing agent was displayed. Thus each pore-sealing agent permeated the surface of the spray deposit as deep as 200 μm. It was confirmed that the pore-sealing agents of the examples were sufficiently durable for a thermal stress at the interface which is generated by the heat cycle treatment and the leaving at high temperature.

The above-described results indicate that the diethylglutaric anhydride is a very effective compound as the hardener for the pore-sealing agent in the examples 13, 14, and 15.

The above-described test results indicate that by filling the pores (gaps) of the spray deposit with the pore-sealing agent of the present invention, the gaps in the spray deposit can be effectively filled with the pore-sealing agent, and in a long-term thermal history (heat cycle, leaving of specimen at high temperature), hardening and contraction do not progress. Thus it is possible to prevent the penetration of water from outside for a long time. Further by filling the pores (gaps) of the spray deposit with the pore-sealing agent, the adhesion of the spray deposit to the base material is improved. Consequently without decreasing the inherent value of the oxide ceramic spray deposit, it is possible to restrain a decrease of the insulation resistance value and the withstand voltage property.

INDUSTRIAL APPLICABILITY

The pore-sealing agent of the present invention is excellent in the permeability into the pores (gaps) and the pore-filling performance. Thus it is possible to perform a pore-sealing operation until the state in which the gaps of the thermally spray deposit material are substantially entirely filled with the pore-sealing agent is obtained. Because there is no possibility that the pore-sealing characteristic deteriorates with age, it is possible to preferably utilize the pore-sealing agent for forming the spray deposit which can be prevented from separating from the base material during the use of a bearing or the like.

The pore-sealing agent-permeated and pore-sealing agent-filled layer is present in a sufficient amount in the member for coating the spray deposit of the present invention. Therefore even though the surface of the spray deposit is ground or abraded after the pore-sealing operation finishes, it is possible to greatly improve the heat resistance, wear resistance, and corrosion resistance of the spray deposit and further the mechanical and electrical properties thereof. Therefore the member for coating the spray deposit can be preferably utilized as a protective member and a modifying member for the spray deposit of various industrial mechanical component parts, composed of steel or the like, which are required to be post-treated with high accuracy.

EXPLANATION OF REFERENCE NUMERALS AND SYMBOLS

Figure 1:
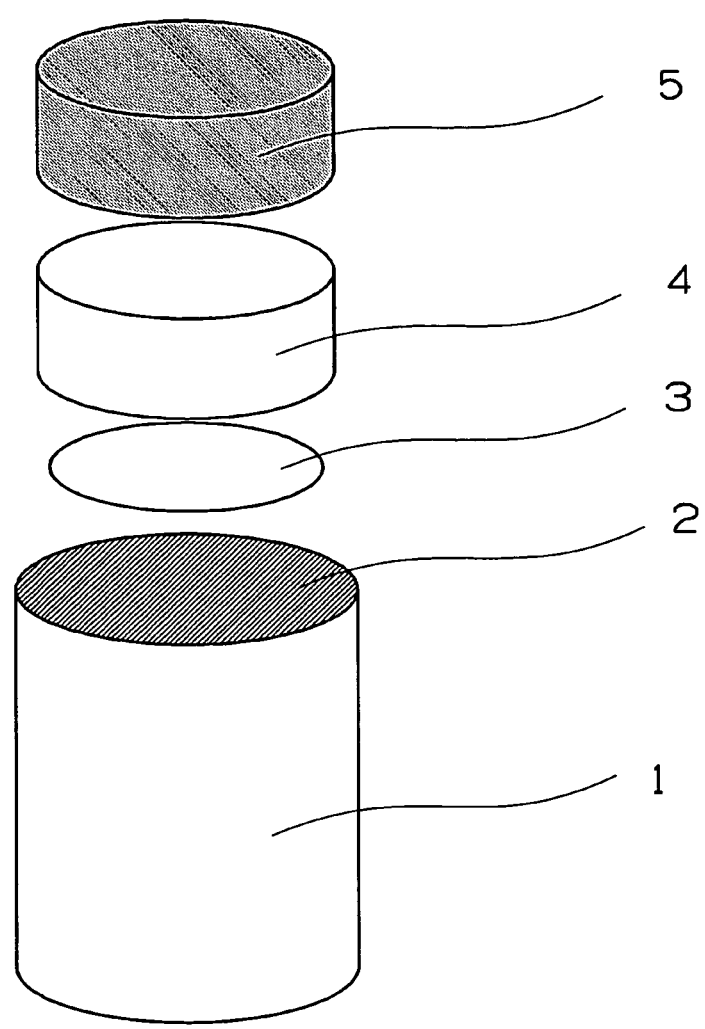
FIG. 1 shows the outline of a ferroxyl test.
Figure 2:
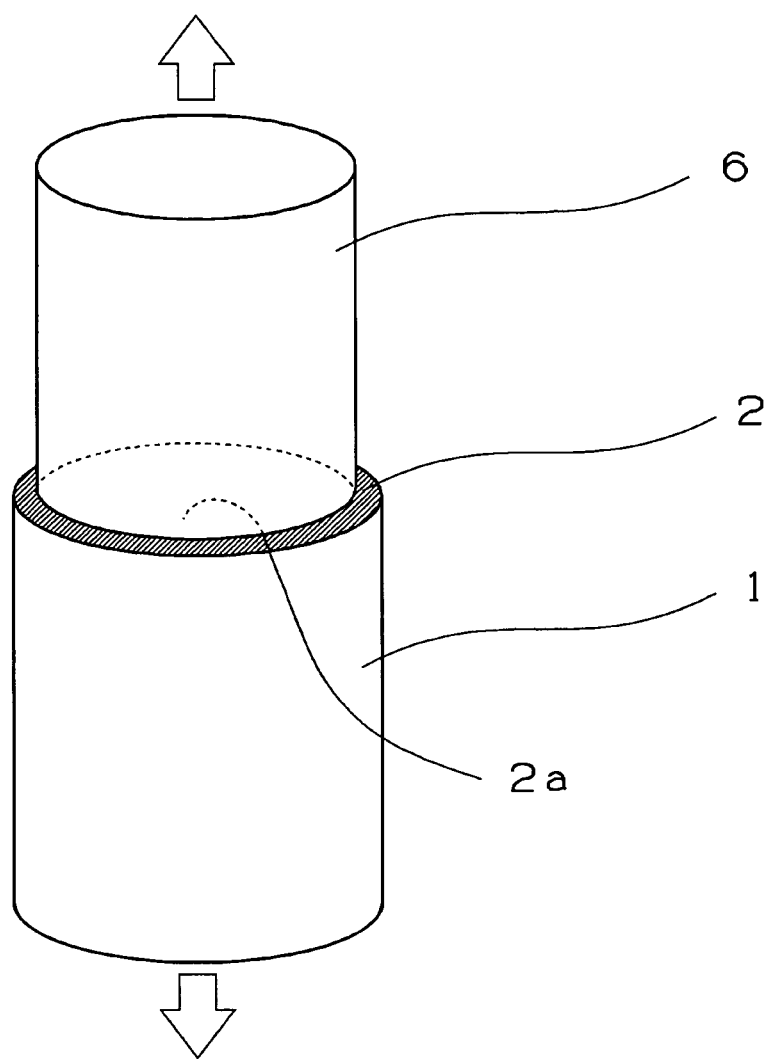
FIG. 2 shows the outline of an adhesive strength test.
Figure 3:
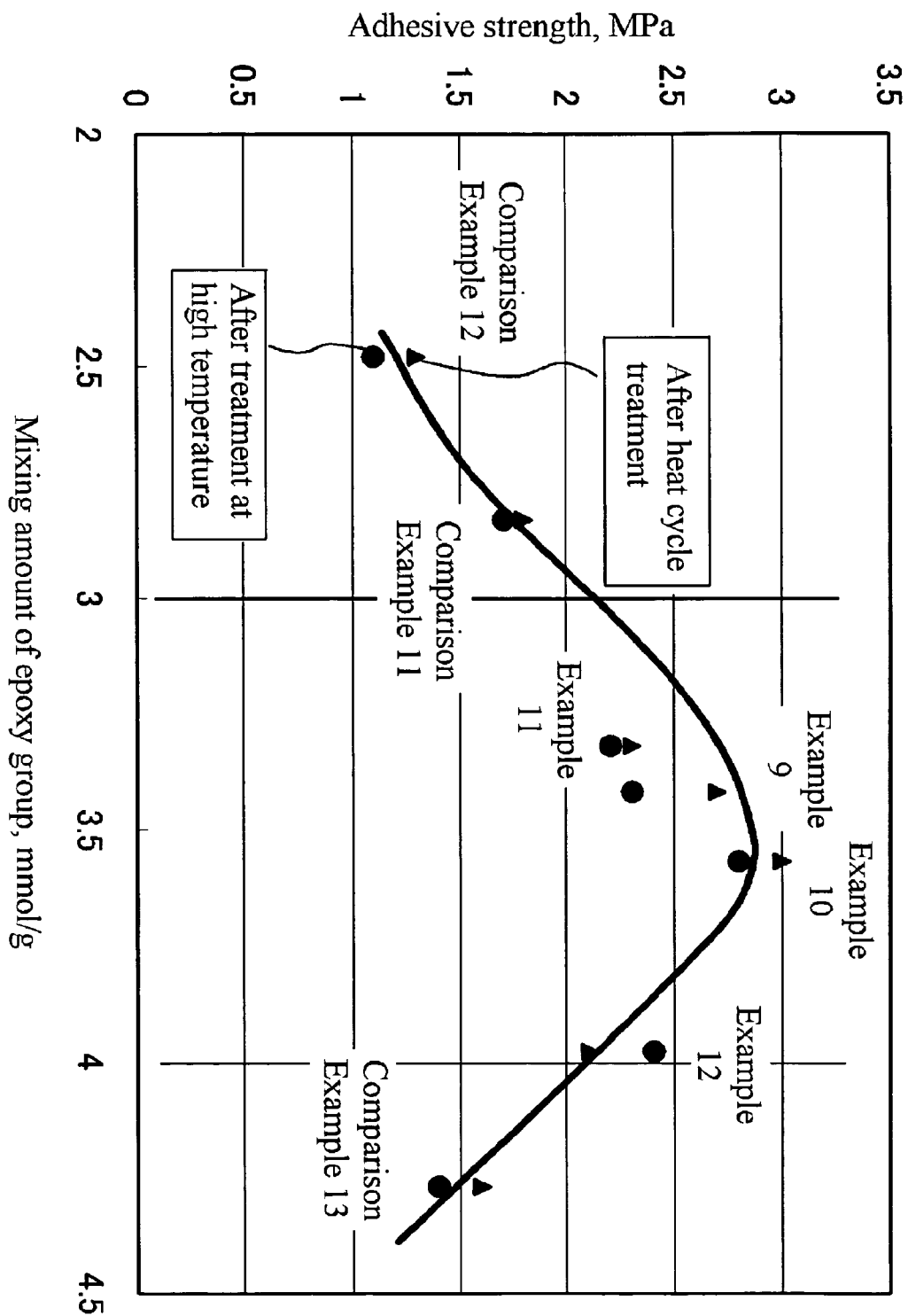
FIG. 3 shows the results of the adhesive strength test.
Figure 4:
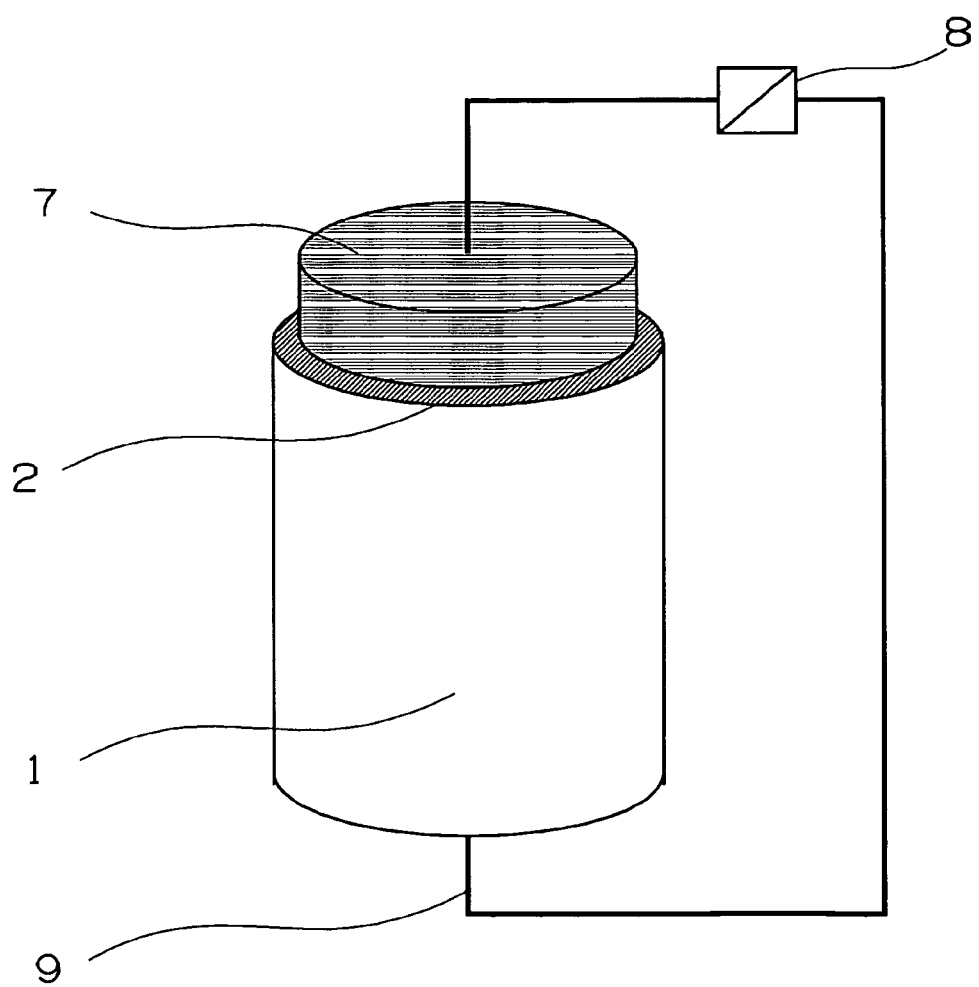
FIG. 4 shows the outline of an insulation resistance test.
Figure 5:
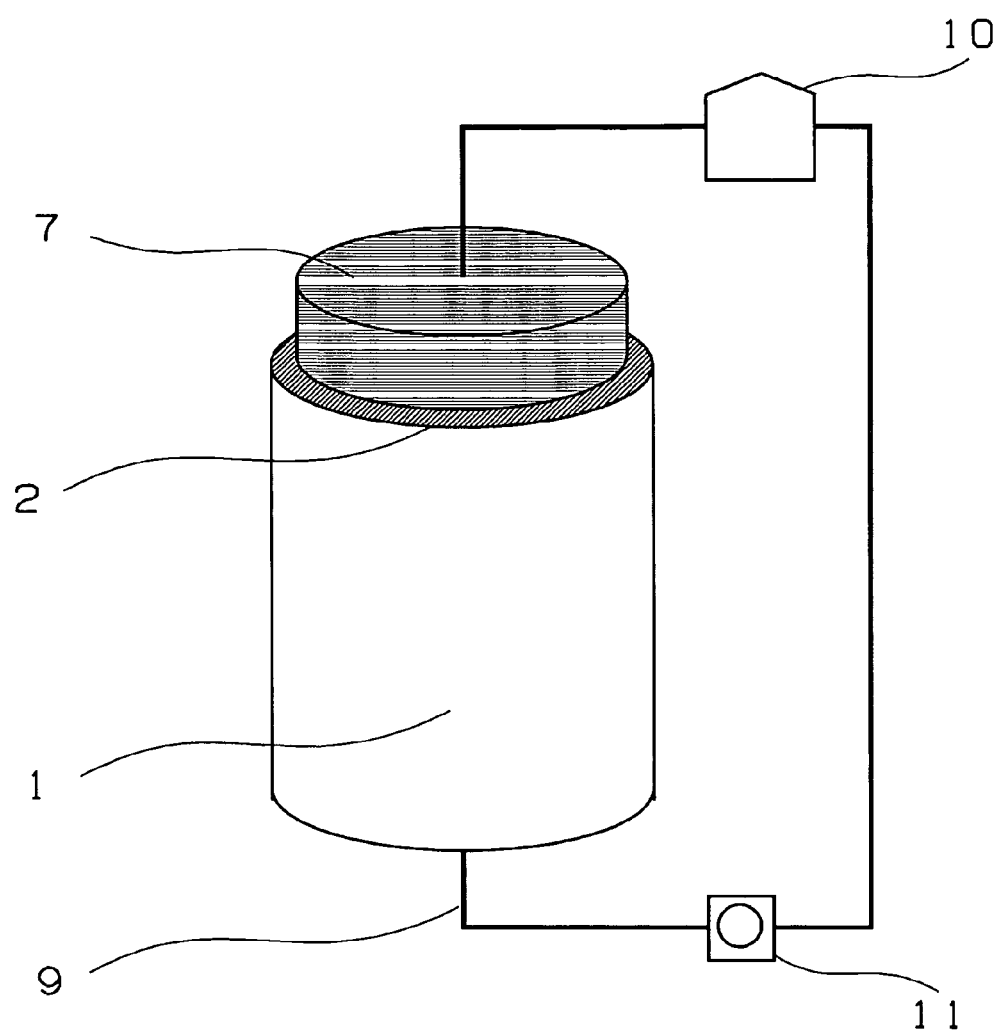
FIG. 5 shows the outline of a withstand voltage property test.

1: specimen base material
2: pore-sealed spray deposit
3: filter paper dipped in ferroxyl test solution
4: tin plate
5: weight
6: pulling jig
7: electrode
8: insulation resistance meter
9: wiring
10: high-voltage generation apparatus
11: monitor

The invention claimed is:

1. A pore-sealing agent for a spray deposit, which is free from a polymerizable vinyl group-containing solvent, consisting of an epoxy group-containing component, a hardener and a hardening accelerator,
   wherein said epoxy group-containing component is a mixture which consists of triglycidyl ether compound having three epoxy groups in one molecule having a viscosity and at least one compound selected from among an alkylenediglycidyl ether compound and a cyclic aliphatic diepoxy compound, each of which contain two epoxy groups in one molecule thereof and each of which having a viscosity; and excluding said hardener and said hardening accelerator, more than 50 wt % and not more than 80 wt % of said triglycidyl ether compound is mixed with an entirety of said epoxy group-containing component,
   wherein the viscosity of said triglycidyl ether compound at 25° C. is not more than 500 mPa·s, the viscosity of said alkylenediglycidyl ether compound at 25° C. is not more than 30 mPa·s, and the viscosity of said cyclic aliphatic diepoxy compound at 25° C. is 10 mPa·s, with the proviso that the viscosity of said triglycidyl ether compound is higher than the viscosity of said at least one compound selected from among said alkylenediglycidyl ether compound and a cyclic aliphatic diepoxy compound, each of which contain two epoxy groups in one molecule thereof, and
   wherein said hardener contains an acid anhydride.

2. The pore-sealing agent according to claim 1, wherein an amount of an epoxy group contained in 1 g of said pore-sealing agent is set to a range from 3.0 mmol to 4.0 mmol.

3. The pore-sealing agent according to claim 1, wherein a density of said pore-sealing agent after said pore-sealing agent hardens is smaller than a density of said pore-sealing agent before said pore-sealing agent hardens.

4. A member for coating a spray deposit disposed on a metal base material, which is pore-sealed with a pore-sealing agent, wherein said pore-sealing agent is according to claim 1.

5. A bearing comprising a member for coating a spray deposit formed on a surface of a bearing-constructing member, wherein said member for coating a spray deposit is according to claim 4.

6. The pore-sealing agent according to claim 1, wherein said hardener comprises a diethylglutaric anhydride.

7. A member for coating a spray deposit disposed on a metal base material, which is pore-sealed with a pore-sealing agent, wherein said pore-sealing agent is according to claim 1.

8. A bearing comprising a member for coating a spray deposit formed on a surface of a bearing-constructing member, wherein said member for coating a spray deposit is according to claim 7.

9. The pore-sealing agent according to claim 1, wherein said triglycidyl ether compound is trimethylolpropane triglycidyl ether.

10. A pore-sealing agent for a spray deposit, which is free from a polymerizable vinyl group-containing solvent, consisting of an epoxy group-containing component and a hardener, wherein said epoxy group-containing component is a mixture which consists of a triglycidyl ether compound having three epoxy groups in one molecule and having a viscosity and at least one compound selected from among an alkylenediglycidyl ether compound and a cyclic aliphatic diepoxy compound, each of which contain two epoxy groups in one molecule thereof and each having a viscosity; and excluding said hardener, more than 50 wt % and not more than 80 wt % of said triglycidyl ether compound is mixed with an entirety of said epoxy group-containing component, wherein the viscosity of said triglycidyl ether compound at 25° C. is not more than 500 mPa·s, the viscosity of said alkylenediglycidyl ether compound at 25° C. is not more than 30 mPa·s, and the viscosity of said cyclic aliphatic diepoxy compound at 25° C. is 10 mPa·s, with the proviso that said viscosity of said triglycidyl ether compound is higher than said viscosity of said at least one compound selected from among said alkylenediglycidyl ether compound and a cyclic aliphatic diepoxy compound, each of which contain two epoxy groups in one molecule thereof, and wherein said hardener contains an acid anhydride.

11. A pore-sealing agent for a spray deposit, which is free from a polymerizable vinyl group-containing solvent, consisting of an epoxy group-containing component, a hardener and a hardening accelerator, wherein said epoxy group-containing component is a mixture which consists of a triglycidyl ether compound having three epoxy groups in one molecule and having a viscosity, at least one compound selected from among an alkylenediglycidyl ether compound and a cyclic aliphatic diepoxy compound, each of which contain two epoxy groups in one molecule thereof each of which having a viscosity, and a monoglycidyl ether compound having one epoxy group in one molecule; and excluding said hardener and said hardening accelerator, more than 50 wt % and not more than 80 wt % of said triglycidyl ether compound is mixed with an entirety of said epoxy group-containing component, wherein the viscosity of said triglycidyl ether compound at 25° C. is not more than 500 mPa·s, the viscosity of said alkylenediglycidyl ether compound at 25° C. is not more than 30 mPa·s, and the viscosity of said cyclic aliphatic diepoxy compound at 25° C. is 10 mPa·s, with the proviso that said viscosity of said triglycidyl ether compound is higher than said viscosity of said at least one compound selected from among said alkylenediglycidyl ether compound and a cyclic aliphatic diepoxy compound, each of which contain two epoxy groups in one molecule thereof, and wherein said hardener contains an acid anhydride.

12. A pore-sealing agent for a spray deposit, which is free from a polymerizable vinyl group-containing solvent, consisting of an epoxy group-containing component and a hardener, wherein said epoxy group-containing component is a mixture which consists of a triglycidyl ether compound having three epoxy groups in one molecule and having a viscosity, at least one compound selected from among an alkylenediglycidyl ether compound and a cyclic aliphatic diepoxy compound, each of which contain two epoxy groups in one molecule thereof, each of which having a viscosity and a monoglycidyl ether compound having one epoxy group in one molecule; and excluding said hardener, more than 50 wt % and not more than 80 wt % of said triglycidyl ether compound is mixed with an entirety of said epoxy group-containing component, wherein the viscosity of said triglycidyl ether compound at 25° C. is not more than 500 mPa·s, the viscosity of said alkylenediglycidyl ether compound at 25° C. is not more than 30 mPa·s, and the viscosity of said cyclic aliphatic diepoxy compound at 25° C. is 10 mPa·s, with the proviso that said viscosity of said triglycidyl ether compound is higher than said viscosity of said at least one compound selected from among said alkylenediglycidyl ether compound and a cyclic aliphatic diepoxy compound, each of which contain two epoxy groups in one molecule thereof, and wherein said hardener contains an acid anhydride.

* * * * *